United States Patent
Cardarelli

(10) Patent No.: US 8,156,806 B1
(45) Date of Patent: Apr. 17, 2012

(54) INERTIAL MEASUREMENT UNIT FOR SPIN-STABILIZED AERIAL VEHICLES, AND METHOD OF PROVIDING GUIDANCE INFORMATION USING SAME

(75) Inventor: Donato Cardarelli, Medfield, MA (US)

(73) Assignee: Milli Sensor Systems & Actuators, West Newton, MA (US)

( * ) Notice: Subject to any disclaimer, the term of this patent is extended or adjusted under 35 U.S.C. 154(b) by 396 days.

(21) Appl. No.: 12/332,275

(22) Filed: Dec. 10, 2008

Related U.S. Application Data

(60) Provisional application No. 61/012,664, filed on Dec. 10, 2007.

(51) Int. Cl.
  G01P 15/00 (2006.01)
  G01C 19/00 (2006.01)
(52) U.S. Cl. ....................... 73/511; 73/504.04
(58) Field of Classification Search ............ 73/504.02, 73/504.04, 504.03, 504.12, 504.13, 504.14, 73/510, 511, 514.16, 514.35
  See application file for complete search history.

(56) References Cited

U.S. PATENT DOCUMENTS

| | | | |
|---|---|---|---|
| 5,712,426 A * | 1/1998 | Sapuppo et al. ............ 73/504.03 |
| 6,494,093 B2 * | 12/2002 | McCall et al. ................. 73/497 |
| 6,725,719 B2 | 4/2004 | Cardarelli | |
| 6,859,751 B2 | 2/2005 | Cardarelli | |
| 7,191,636 B2 | 3/2007 | Jaffe | |
| 7,406,867 B2 | 8/2008 | Cardarelli | |
| 7,549,334 B2 * | 6/2009 | Cardarelli ................. 73/504.13 |
| 7,617,728 B2 * | 11/2009 | Cardarelli ................. 73/504.16 |
| 2007/0240486 A1 | 10/2007 | Moore et al. | |
| 2007/0245800 A1 | 10/2007 | Shirasaka et al. | |

OTHER PUBLICATIONS

"An Overview of the Allan Variance Method of IFOG Noise Analysis," IEEE Standard Specification Format Guide and Test Procedure, Std 952-1997.
"Inertial Sensor Test Equipment, Instrumentation, Data Acquisition and Analysis," IEEE P1554/D15d, Apr. 2005, pp. 70-110.
Pitman, G.R. Jr., "Inertial Guidance, University of California Engineering and Physical Sciences Extension Series" J. Wiley and Sons, Inc., New York, 1962, J.S. Ausman, ch. 3.

* cited by examiner

Primary Examiner — Helen C. Kwok
(74) Attorney, Agent, or Firm — Brian M. Dingman; Mirick, O'Connell, Demallie & Lougee, LLP

(57) ABSTRACT

An inertial measurement unit (IMU) for a spinning aerial vehicle that spins about a spin axis having a substrate defining a plane, the substrate fixed to the vehicle with the plane essentially orthogonal to the spin axis so that the substrate spins about the spin axis as the vehicle does, at least one generally planar gyroscope coupled to the substrate, the gyroscope defining a gyro input axis that is essentially parallel to the plane and generating a gyro output signal, at least one generally planar accelerometer coupled to the substrate, the accelerometer defining an accelerometer input axis that is essentially parallel to the plane and generating an accelerometer output signal, and a system for demodulating the gyro output signal with a phase-sensitive demodulation referenced to the accelerometer output signal. Also featured is a method of providing guidance information for a spinning aerial vehicle that spins about a spin axis using the described system.

15 Claims, 22 Drawing Sheets

INERTIAL MEASUREMENT UNIT FOR SPIN-STABILIZED AERIAL VEHICLES, AND METHOD OF PROVIDING GUIDANCE INFORMATION USING SAME

CROSS REFERENCE TO RELATED APPLICATION

This application claims priority of provisional application Ser. No. 61/012,664 filed on Dec. 10, 2007, the entire contents of which are incorporated herein by reference.

FIELD OF THE INVENTION

This invention relates to the guidance of spin-stabilized rockets, munitions and other aerial vehicles with a MEMS Inertial Measurement Unit (IMU).

BACKGROUND OF THE INVENTION

Micro-electro-mechanical systems (MEMS) gyroscopes and accelerometers, such as disclosed in U.S. Pat. Nos. 6,725,719, 6,859,751 and 7,406,867 (all incorporated herein by reference), are generally planar instruments. Due to their very small size, and materials and methods of construction, such MEMS inertial instruments are relatively sensitive to ambient temperature and other environmental factors, such as shock, vibration and acoustics. These sensitivities make them relatively unstable. Accordingly, it has been necessary to extensively test such instruments under a variety of conditions in order to develop a priori compensation schemes that can then be built into systems employing such instruments. This testing is time consuming and expensive, and also may not anticipate every possible condition that the instrument may be exposed to, which can lead to errors. The accuracy of MEMS gyroscopes and accelerometers depends on the stability of their bias. Bias is the non-zero instrument output in the absence of input. The bias has deterministic and random components. Each deterministic component can be related to a cause, which potentially can be controlled. Random components can be traced to a cause but cannot be controlled. The pertinent random component for this invention is the 1/f noise, one source of which is the intrinsic shot noise in the electronics. The deterministic components include turn-on to turn-on variations, offset and drift.

The problem is that under motion, the instrument bias is undistinguishable from the signal generated by the motion, hence the output is incorrect and the MEMS instrument is impractical and requires continuous correction to be useful.

A method for separating the bias from the signal is to spin the instrument so that its input axis is rotated relative to the body axis of measurement. The effect of the spin is to modulate the signal, with the signal maximum occurring when the two axes are aligned; this does not to modulate the bias, because it is not sensitive to the rotation. The bias can then be filtered and the modulated signal demodulated back to DC where the peak-to-peak of the modulated signal is proportional to the stabilized instrument signal. The modulation method is referred to as Phase Sensitive Demodulation (PSD) and is a standard practice applied for separating signals from noise especially if the signal is weak and imbedded in the noise. The spin is generally applied with a carousel having a built-in angle resolver. From the resolver a reference waveform is developed which is necessary for the demodulation step. The resolver is aligned with the instrument Input Axis, which is aligned with a body axis of the vehicle.

The gyro instrument measures rotation rate about the body axis. The accelerometer instrument measures acceleration along the body axis. The gyros and accelerometers make up an IMU. At least one gyro and one accelerometer is necessary for each body axis for the IMU to measure all six degrees-of-freedom of the vehicle motion. The Input Axes of the gyros and accelerometers are aligned with the three orthogonal axes of the IMU and the IMU axes are aligned with the three body axes of the vehicle. The body axes of the vehicle are the Pitch, Yaw and Roll Axes. One IMU alignment is for its Z-axis to align with the carousel spin axis and with the Roll Axis. For this case the Input Axes of the X, Y gyros and accelerometers are rotated about the spin axis and are therefore stabilized by the PSD method. The Z gyro and Z accelerometer are not.

Each of the X, Y instruments senses inputs of the Pitch and Yaw vehicle axes as they are rotated. Therefore the signals of the X, Y instruments are the sums of the separate Pitch and Yaw rates components. Two reference waveforms phased with the Pitch and Yaw axes are needed to separate the two components for each instrument.

The spin rate of the carousel is a determinant of the effectiveness of the method. A smaller instrument with greater bias instability will require a higher spin rate. The capability for the instrument to be unaffected during spin is an important requirement. In particular for MEMS instruments, which have low signals, the 1/f instability is relatively high. Therefore in addition to the reduction of the long-term bias drift, the reduction of the 1/f instability will improve the bias instability and best achievable resolution; two important performance parameters.

SUMMARY OF THE INVENTION

The invention includes the use of a MEMS IMU to a spin-stabilized rocket (or any other spinning body whose orientation/attitude and/or acceleration needs to be sensed) and to take advantage of the available spin to spin-stabilize the X, Y gyroscope and accelerometer instruments; that is, to remove the bias from their signals and to do it without an expensive carousel. The bias stabilized instruments will further achieve performance improvement for greater accuracy and precision.

An advantage to the spinning vehicle is that MEMS instruments will operate under the spin and the improved performance enables the replacement of more expensive, larger instruments that may require de-spinning hardware. A related advantage is the reduced weight and reduction in required fuel.

The difference between the non-spinning vehicle with carousel and the spinning rocket is that the spinning rocket does not have an angle resolver and the body axes rotate with the rocket. The requirement for the rocket is to obtain rates about essentially non-spinning body axes (Pitch and Yaw) that can be related to Earth's Axes. This issue is resolved in the invention through an angle resolver that is based on the direction of gravity (Gravity Axis), and on the use of the accelerometer signals to detect it. The Gravity Axis will enable the identification of the non-spinning Pitch and Yaw Axes, which will be used to demodulate the X, Y gyroscope signals to obtain Pitch and Yaw rotation rates with the gyroscopes and to demodulate the accelerometer signals to obtain accelerations along the same axes. The invention applies to motions for which gravity is measurable with the accelerometers.

This invention addresses a method to separate both deterministic and 1/f random bias components from the signal and enable long-term use of the instrument, without correction updates as provided by GPS and enable autonomous operation.

This invention is based on the spin provided by the spinning vehicle and Phase Sensitive Demodulation enabled by reference waveforms obtained from the spinning X, Y accelerometer signals where the X, Y accelerometers are modulated by their rotation in the plane relative to the Gravity Axis.

This invention also is based on the gravity-modulated accelerometer signals, which are the basis for bias stabilization of the X, Y gyroscopes and accelerometers.

The invention uses Phase Sensitive Demodulation (PSD) in conjunction with the reference waveforms to develop DC voltages proportional to Pitch and Yaw rate amplitudes. PSD is necessary because the spin modulates the gyro signal.

The phasing of the spin-modulated accelerometer signals can be used to check the rotation rate measured by the Z-gyro of the IMU, since a full $2\pi$ angle is obtained with each vehicle revolution.

This invention also relates to the improvement of bias instability and best resolution performance of the X, Y gyroscopes and accelerometers.

This invention also relates to the stabilization of MEMS gyros and accelerometers integrated onto the same chip by fabrication to achieve stable alignment of the instrument axes to the vehicle body axes. Misalignment of the instruments relative to the spin axis develops error since it will enable the instruments to sense spin rate. Misalignments of the instruments relative to each other will make measurements relative to the Pitch, Yaw and Roll axes, another error.

This invention also relates to the use of the X, Y instruments that are not sensitive to the spin rate. That is, they have no substantial cross-axis sensitivity.

The invention also relates to the use of two accelerometers for each axis and located on either side of the IMU center. The two accelerometers for each axis will enable the detection and cancellation of rotation signals from the desired linear acceleration signals.

This invention also relates to the use of one X, Y gyro as sufficient to measure both Pitch and Yaw rotation rates, as the gyro rotation under spin senses both rotation rate inputs. To obtain the separate rates, the sum gyro signal is demodulated with reference waveforms phased to the Pitch and Yaw Axes. The use of both gyros makes the full IMU redundant for this measurement.

This invention also relates to the use of one X, Y accelerometer as sufficient to measure accelerations along the Pitch and Yaw Axes as the accelerometer rotation under spin senses both inputs. To obtain the separate acceleration inputs the sum acceleration signal is demodulated with reference waveforms phased to the Pitch and Yaw Axes. The use of both sets of X, Y accelerometers makes the full IMU redundant for this measurement.

This invention also relates to the use of the angle resolver to provide compensation for the Z-gyroscope since it provides a reference rotation rate about the spin axis. The resolver function is provided by the gravity-modulated accelerometers. In addition, since the total spin angle is known for each spin revolution, the integrated angle of the Z-gyro can be corrected to remove the angle random walk error.

This invention further relates to the elimination of the quadrature error in the MEMS gyro because the quadrature is a source of bias.

BRIEF DESCRIPTION OF THE DRAWINGS

Other objects, features and advantages will occur to those skilled in the art from the following descriptions of the preferred embodiments, and the accompanying drawings, in which.

DESCRIPTION OF THE PREFERRED EMBODIMENTS

Introduction

Figure 1:
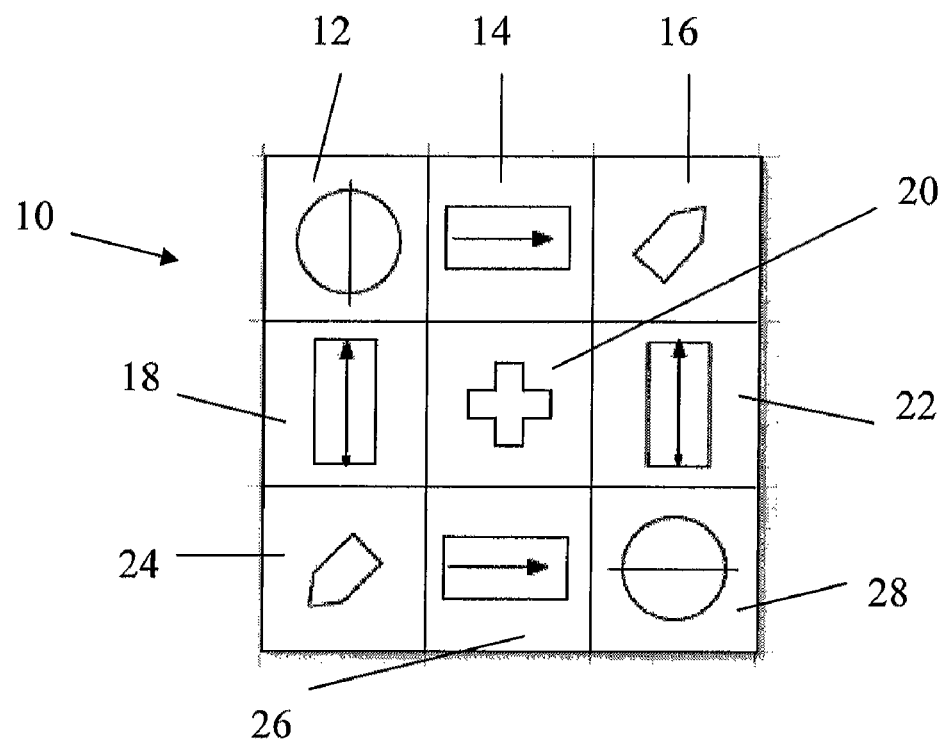
FIG. 1 is a schematic diagram of a MEMS integrated IMU that can be used with the invention.

Spin-stabilized rockets and munitions require attitude information relative to the Earth for guidance and navigation purposes. The IMU gyro instruments measure rotation rates about the Pitch, Roll and Yaw Axes (the effective body axes that do not spin with the vehicle) which can be related to inertial axes. The IMU accelerometer instruments measure acceleration along the same axes.

MEMS IMU instruments by themselves are not sufficiently stable for applications where external inputs such as GPS are not available. Much of the instability is due to bias which changes with time and cannot be distinguished from the instrument signals. The spin-modulation approach is designed to separate the bias from the signal during flight. For the spinning aerial vehicle application, the spinning vehicle creates the instrument response that has to-date been accomplished with a carousel. An accelerometer that senses the gravity (G)-vector is used to supply information regarding the spin rate.

An embodiment of the invention utilizes a planar MEMS IMU that integrates one or more planar gyroscopes and one or more accelerometers on the same substrate with fixed, stable alignments between the instruments. The X, Y gyros and accelerometers are stabilized by the method since their Input Axes are in the plane of the substrate. The X, Y gyroscopes are selected because they are single degree-of-freedom designs with very low cross-axis sensitivity.

The spin modulates the signals of the X, Y gyros and accelerometers. The modulation allows the separation of the signals from the bias instability. The instability is filtered and the signals demodulated using reference waveforms phased to the Pitch and Yaw Axes. This method is referred to Phase Sensitive Demodulation (PSD), which in a general sense is well known in the art. The reference waveforms are obtained from the modulated accelerometer signals.

The bias stability is related to Allan Deviation Analysis, and the spin rate requirement for effective stabilization is obtained from this analysis.

Non-MEMS IMU instruments (gyroscopes and accelerometers) are affected by spin, and therefore when such are used in a spinning vehicle need to be anti-spun and maintained in alignment with the non-spinning body axes. The more sensitive the instruments, the more susceptible they are to the spin. In contrast, MEMS IMU instruments that are stabilized by the vehicle spin as disclosed herein enables the replacement of the more expensive instruments, de-spinning hardware and their combined weight by an algorithm.

Integrated MEMS IMU

An Integrated MEMS IMU is used in an embodiment of the invention because all the instruments are precisely aligned to each other, and so only the IMU alignment to the vehicle need to be made: the IMU Z-Axis is aligned to the vehicle Spin Axis, and the IMU X, Y Axes are aligned to the vehicle body axes (Pitch and Yaw Axes). Another advantage is that if the rocket does not spin true, the signals from the IMU can be used to stabilize the rocket.

Integrated MEMS IMUs are known in the art. See, for example, U.S. Pat. No. 6,725,719, which is incorporated herein by reference. The IMU is a single planar substrate containing all the gyroscopes and accelerometers necessary to sense motion in six degrees-of-freedom. This form factor (die) enables great flexibility for incorporation into packaging and system concepts. The die is a single vacuum-encapsulated chip with pads for electrically connecting to electronics. The die consists of independent silicon sensors, which are formed on a rugged Pyrex substrate. The instruments are aligned to the precision of photolithography. Vacuum encapsulation is implemented at the chip level and eliminates the need to vacuum encapsulate each instrument or the entire package. A getter is included in the cavity to stabilize the vacuum level. The rugged non-electrically conducting substrate provides electrical isolation between devices and provides a stable platform for maintaining the inter-device alignments and for reducing the stress imparted to the devices by the package. The die form-factor is enabled by the planar designs of all the devices, including the Z-axis gyro further discussed herein.

An integrated IMU design 10 that can be used in the invention is shown in FIG. 1. Row-by-row and from left to right, the instruments are: Y-Gyro 12, X-Accelerometer 14, Z-Accelerometer 16, Y-Accelerometer 18, Z-Gyro 20, Y-Accelerometer 22, Z-Accelerometer 24, X-Accelerometer 26, and X-Gyro 28. All are single degree of freedom designs. Other arrangements are possible, as long as they accomplish the IMU functionality necessary for the different embodiments described herein.

A unique feature of this IMU chip design is that two accelerometers are provided for each axis. The reason is that, because all accelerometers are sensitive to rotation rate, the output signal includes linear as well as rotation rate components. By using two identical accelerometers for each sensing axis, located on opposite sides of the spin axis, and combining the signals differentially, the rotation component can be subtracted from the total signal, leaving the linear acceleration signal. Essentially, the design compensates the accelerometer outputs at the chip level for rotation rate. The spin rate does not contribute to the rotation rate sensitivity by the X, Y accelerometers if the spin rate is constant.

In the spinning vehicle application the accelerometers provide an additional function, to locate the G-Axis. The schematic description of the IMU is sufficient for discussion of the algorithms (methodologies) described below. Gx, Gy and Gz are the X, Y and Z gyroscopes, respectively. Ax, Ay, and Az are the X, Y and Z accelerometers, respectively.

G2-Gyroscope

The gyroscope of the IMU used in the preferred embodiment is selected because of its insensitivity to cross-axis rotations and therefore is insensitive to spin about the spin axis. Without this property, the gyro is not a good candidate and may de-stabilize instead. Analysis has shown that the G2 gyro is inherently insensitive to cross-axis motions because of its planar symmetry. This property was confirmed experimentally. The G2 gyro is detailed in U.S. Pat. No. 7,406,867, which is incorporated herein by reference. Other MEMS gyroscope designs having this property are also good candidates.

Figure 2:
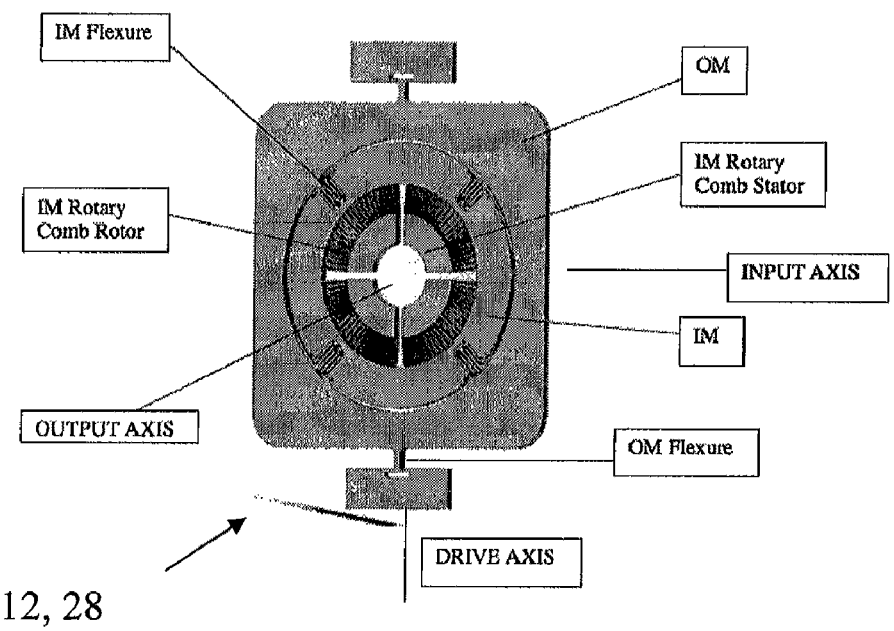
FIG. 2 is a schematic diagram of a gyroscope used in the IMU of FIG. 1.

The G2 gyro design for instruments 12 and 28 is schematically depicted in FIG. 2 and consists of an Inner Member (IM) attached concentrically by four radial flexures to an Outer Member (OM). The OM is mounted by two torsional flexures to mounting pads (mesas) that are attached to the substrate. The mounting pads suspend the device above the substrate to allow angular motions of the IM and OM relative to the substrate. Capacitor plates located on the substrate and below the OM are used to actuate and sense the OM motion relative to the plane. Rotary comb capacitor structures are used to sense the in-plane rotary output motion of the IM (gyro output).

To operate the gyro, the OM is actuated to oscillate the OM and IM about the Drive Axis. When the gyro is rotated about the Input Axis, the gyro IM alone oscillates about the Output Axis in response. The amplitude of the IM oscillation is proportional to the input rotation rate.

The IM equation of motion is given by $$I_o \ddot{\theta} + D\dot{\theta} + K\theta = I_o \Omega_d \dot{\phi} \omega \cos \omega t, \text{ where}$$

| | |
|---|---|
| $I_o$: | IM moment of inertia about the o-axis (output axis) |
| $D$: | IM damping coefficient |

-continued $$I_o\ddot{\theta} + D\dot{\theta} + K\theta = I_o\Omega_a\tilde{\phi}\omega\cos\omega t, \text{ where}$$

| | |
|---|---|
| K: | IM flexure stiffness (spring constant) |
| θ: | IM oscillation angle amplitude relative to the OM |
| $\tilde{\phi}$: | OM oscillation angle amplitude relative to the case |
| ω: | OM oscillation frequency |
| $\Omega_a$: | rotation rate about the Input Axis |

For the case of matched OM and IM natural frequencies, the output amplitude is given by $$\tilde{\theta} = \frac{I_o\tilde{\phi}}{D}\Omega_a$$

The very low cross-axis sensitivity of the G2-Gyroscope is due to the symmetry of the IM about the Output Axis.

Accelerometers

The accelerometers are simple in-plane mass displacement designs for the X and Y directions, and a pendulous design for the Z-Axis where the motion is relative to the plane. The X and Y accelerometers can be operated open loop or closed loop. The pendulous Z-accelerometer needs to be operated closed loop. Fortunately, the Z-accelerometer is not directly affected by the spin. The X, Y accelerometers are designed and oriented on the planar IMU not to displace with the centrifugal acceleration caused by the spin.

Bias Characterization for Spin Stabilization

Spin stabilization is used to stabilize the signal of the instrument by removing the bias instability signals. Gyroscope bias is the non-zero output of the instrument in the absence of input rotation rate (for the case of the gyro) or acceleration (for the case of the accelerometer). It includes offset bias, turn-onto-turn-on bias, short term bias instability and long-term drift. The offset values can be zeroed out during an initialization phase. The last two are "in-run" instabilities that occur during flight and cannot be distinguished from real signals. To some extent, short-term instabilities can be characterized fairly well and long-term drift becomes the major problem in long flights.

The practice with MEMS devices has been to measure all the long-term sensitivities and compensate for them via look-up tables. With spin-stabilization methods the correction is made in real-time. However, since MEMS instruments are very unstable, the spin speed needs to be proportionately larger than has been the practice with larger, more stable conventional instruments. The spin speed and its relation to the instability is an important variable. Essentially, spin stabilization for MEMS instruments is intended to remove long-term bias drift as well as short-term instability; the latter affects performance: bias instability and maximum resolution. The white noise is excluded from consideration since it cannot be diminished by spin.

Generally the bias drift can be measured by taking a time record of the instrument output. The offset is simply obtained and generally taken out during initialization of the instrument. The drift relation with temperature can be monitored to obtain thermal sensitivity. To measure short-term instability, the Allan Deviation Analysis (ADA) is used. See "An overview of the Allan Variance method of IFOG noise analysis"; IEEE Standard Specification Format Guide and Test Procedure, Std 952-1997. It conveniently separates the white, 1/f and long-term components of the bias. The resolution and angle random walk (gyro) are derived from the white noise. The bias instability is obtained from the 1/f level.

Allan Deviation Analysis and Bias Noise Characteristics

Figure 3:
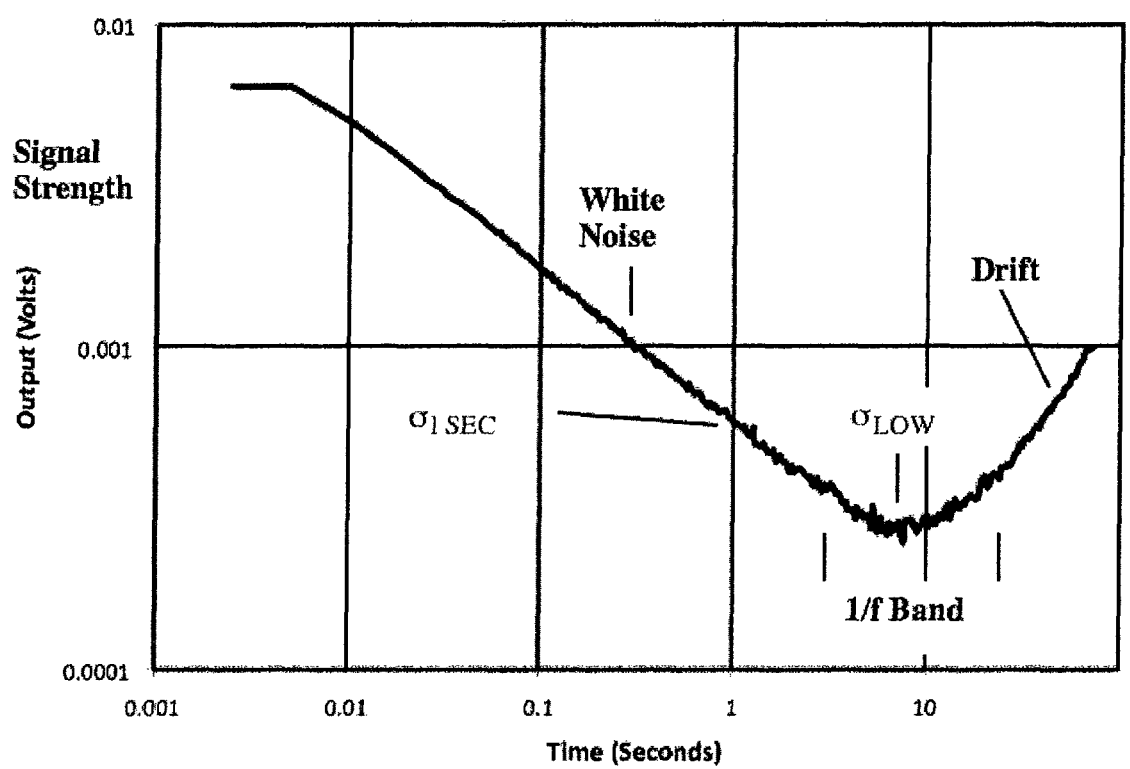
FIG. 3 is an Allan deviation analysis that helps illustrate the operation of an embodiment of the invention.

The Allan Deviation Analysis (ADA) plot (see IEEE P1554/D15d, "Inertial Sensor Test Equipment, Instrumentation, Data Acquisition and Analysis", April 2005, pp 70-110) for an example gyro is shown in FIG. 3. It is calculated from the data time record. There are three characteristic slopes in the Allan Deviation plot. The first is the $-\frac{1}{2}$ slope descending from the left. This slope corresponds to the white noise in the data. The horizontal axis is for integration time, t, and the vertical axis is for the deviation voltage, $\sigma_{low}$. The deviation value of interest for the white noise is the value at t=1 sec, $\sigma_{1\ sec}$ from which the resolution coefficient is obtained. The angle random walk (ARW) coefficient is then calculated from the resolution value.

The second slope of interest in the Allan Deviation is the zero slope. This slope corresponds to the 1/f noise in the data (flat region band). The deviation value of interest is the value at which the two slopes intersect and is labeled, $\sigma_{low}$, because this is also the lowest deviation value. From this value, are determined the bias instability and best resolution (if the averaging time is increased to the time of intersection).

The +1 slope characteristic to the right is due to long-term bias drift and is most likely due to thermal effects. In this plot, the long-term drift and white noise mask the 1/f characteristic, which may be lower. To improve performance the white noise slope needs to be shifted to the left, which can be accomplished with lower noise electronics. The long-term drift can be reduced with temperature control. Then the true 1/f level can be seen and the best resolution can be achieved with the lowest integration time. Reducing white noise is the only means to reduce ARW. By observing the level and extent of the 1/f instability, the lowest spin stabilization speed required can be determined.

The two parameters of interest from the Allan Deviation plot are the values at the 1 second integration time, $\sigma_{1\ sec}$ and the lowest level, $\sigma_{low}$.

$$\sigma_{1\ sec} = 1.7 \times 10^{-3} \text{ volts}$$

$$\sigma_{low} = 160 \times 10^{-6} \text{ volts}$$

These are essentially the minimum detectable signal voltages (S/N=1) due to white noise and 1/f noise.

Resolution:

From the IEEE document referenced above, the white noise parameter is given by $$N_t = \frac{\sigma_t}{\sqrt{2}} \text{ (volts)} \times \frac{1}{SF} \text{ (dps/volts)} \times \sqrt{t} \quad (SF = \text{Scale Factor})$$

The normalized resolution is given as the white noise coefficient at the 1 second integration time.

$$N_{1sec} = \frac{\sigma_{1sec}}{\sqrt{2}} \text{ (volts)} \times \frac{1}{SF} \text{ (dps/volts)} \times \sqrt{1 \text{ sec}} =$$

$$\frac{1.7 \times 10^{-3}}{\sqrt{2}} \times \frac{1}{5 \times 10^{-3}} \times \sqrt{1 \text{ sec}} = 0.25 \text{ dps}/\sqrt{Hz} = 900 \text{ dph}/\sqrt{Hz}$$

$$(dph = deg/hr)$$

To improve resolution, increase SF and reduce $\sigma_{1\ sec}$.

ARW: (Angle Random Walk)

From the IEEE document, the angle random walk is given by the noise parameter at t=60 seconds.

$$ARW = N_{60sec} = \frac{\sigma_{60sec}}{\sqrt{2}} \times \frac{1}{SF} \times \sqrt{60 \text{ sec}}$$

The $\sigma_{60\ sec}$ can be obtained by extending the white noise slope to t=60 seconds.

The alternative method to calculate the ARW is to multiply the resolution value obtained in the previous step by 60 and appending the appropriate units.

$$ARW = N_{1\ sec} \times 60 = 14.7 \text{ deg}/\sqrt{hr};$$

Bias Instability:

The bias instability is obtained from the lowest 1/f level according to the IEEE document.

$$B = 1.5 \times \sigma_{low} \times \frac{1}{SF}$$

$$B = 1.5 \times \sigma_{low} \text{ (volts)} \times \frac{1}{SF} \text{ (dps/volt)} =$$

$$1.5 \times 160 \times 10^{-6} \text{ (volts)} \times \frac{1}{5 \times 10^{-3}} \text{ (dps/volt)} = 0.05 \text{ dps} = 180 \text{ dph}$$

$$(dph = deg/hr)$$

To improve/decrease the bias instability, increase SF and decrease the $\sigma_{low}$.

Spin-Stabilization Requirement/Phase Sensitive Demodulation

The Phase Sensitive Demodulation algorithm (see Monroe, D., "A lock-in Amplifier Monitor", Princeton Applied Research), follows these steps: the signal is modulated at some frequency with an excitation waveform and therefore is raised to a frequency above the bias instability; the two are passed through a band-pass filter that will pass the signals and remove the bias instability and higher frequency content; the modulated signal is then demodulated back to DC with the excitation signal waveform (taking into account any phasing that may have occurred between them) and low-pass filtering the DC signal to remove unwanted harmonics caused by the demodulation step. One criterion is that the modulation frequency is sufficiently high that the band-pass filter width will not attenuate the modulated signal and sufficiently filters the 1/f instability. The 1/f instability is essentially DC when compared to the higher, modulating excitation. Note that the DC signal content is within the low-pass filter band, which is less than the band-pass filter. The band-pass filter then sets the maximum bandwidth of the instrument.

When the PSD is applied to the ADA data, the spin rate that will reduce both the 1/f and the long-term bias is obtained from the averaging time corresponding to the intersection of the white noise and 1/f slopes or at about 60 seconds for this data. Assuming a modulation frequency of 10 Hz and a band-pass filter centered at 10 Hz with a full width of 5 Hz and a corresponding 5 Hz low-pass filter, an instrument bandwidth of 5 Hz is obtained. The 60 seconds integration time corresponds to $1.7 \times 10^{-2}$ Hz or about 0.11 angHz (angular frequency). As long as this rate is much less than the difference between the angular modulation frequency and the band-pass filter width, the 1/f content will be filtered. For a spinning rocket as much as 4 to 7 Hz (angular) is obtained. Assuming 5 Hz, and a band-pass filter width of 4, the essential instrument bandwidth of four is obtained. The PSD algorithm trades instrument bandwidth with stabilization since the instruments are designed to have larger bandwidth, especially the accelerometers. The spin rate can be increased up to the natural bandwidth of the instrument. This would allow a larger band-pass filter and therefore larger bandwidth for the stabilized instrument.

For the spinning rocket, the modulation excitation is provided by the spin. The demodulation waveform is obtained from the gravity-modulated accelerometers as phase referenced to the G-Axis.

A strength of the spin stabilization method is that the instrument measurement of its input is made faster than the time for the instability to occur. The input rate is sampled at a high rate resulting in an AC gyro signal plus a DC bias, thereby creating a mechanism for discriminating and filtering the bias. The appropriate spin rate depends on the noise, and it also depends on the natural bandwidth of the instrument.

Stabilization Algorithm—Carousel Case

Figure 4:
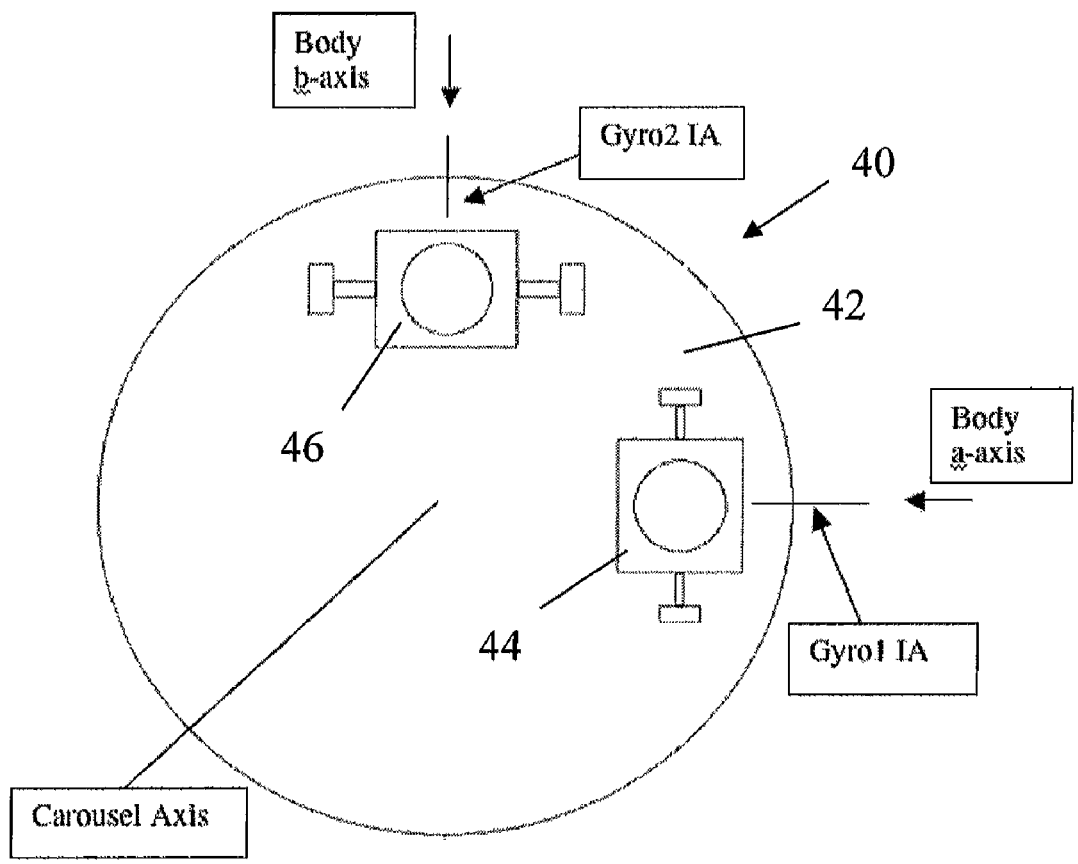
FIG. 4 is a schematic diagram of a carousel set-up with gyroscopes that helps to explain the operation of an embodiment of the invention.

The gyro example 40 is illustrated for two orthogonal gyroscopes G1 44 and G2 46 (FIG. 4) with Input Axes (IA) in the plane. As the carousel 42 spins, the Input Axes of the two gyros rotate about the Carousel Axis. The schematic in FIG. 4 is used to illustrate the arrangement of the gyro, body axes and carousel axes. IA refers to the Input Axis of the gyro. The body axes are labeled a-axis and b-axis and they are stationary and fixed to the non-rotating vehicle. As the gyros rotate with the carousel, each gyro senses rotation rate components about both the a-axis and b-axis and the modulated signal contains the sum of the separate modulation signals.

Figure 5:
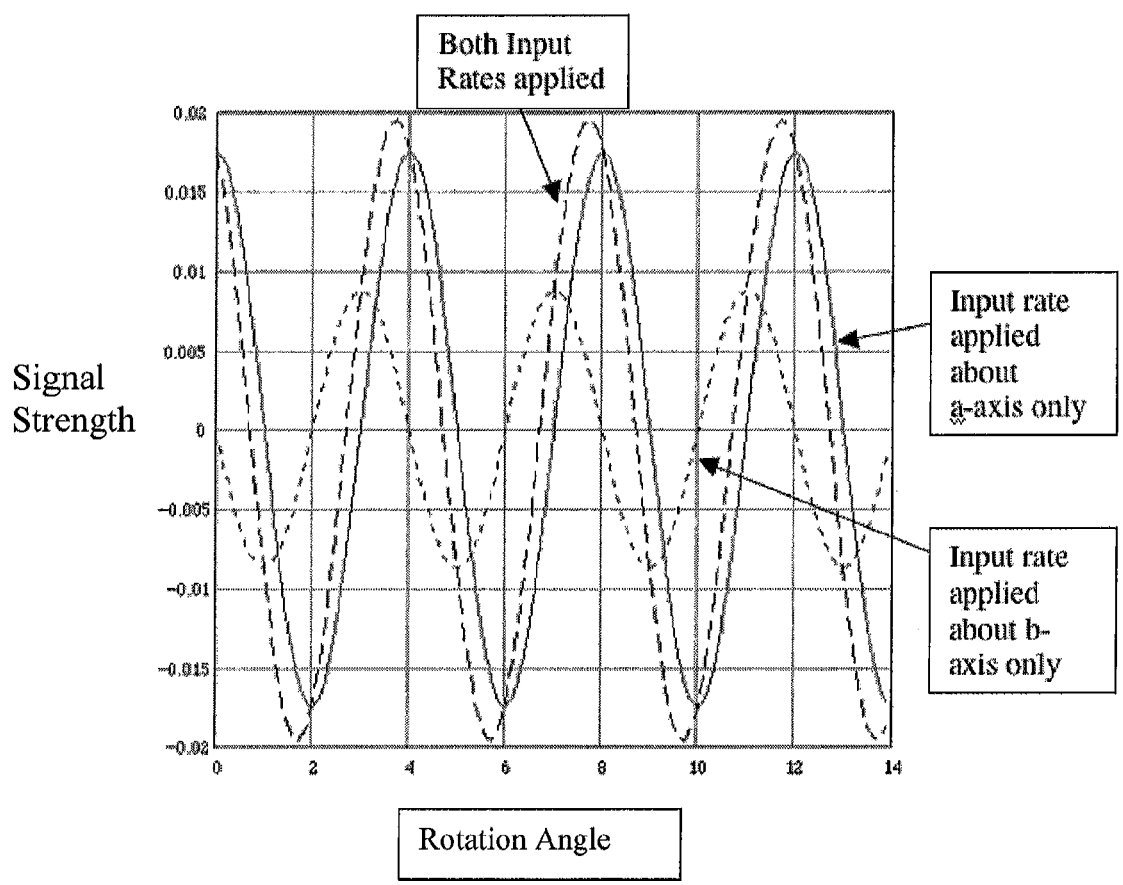
FIG. 5 is a graph of the gyroscope output signals for a-axis rate, b-axis rate and sum for one gyroscope of the set-up of FIG. 4.

This is illustrated in FIG. 5 with a graphical simulation for the case of one gyro (G1) and two orthogonal input rates having different amplitudes. One modulated signal corresponds to input about the a-axis only and the second modulated signal corresponds to input about the b-axis only. The third signal is the sum signal. Note the phase of the sum signal.

Figure 6:
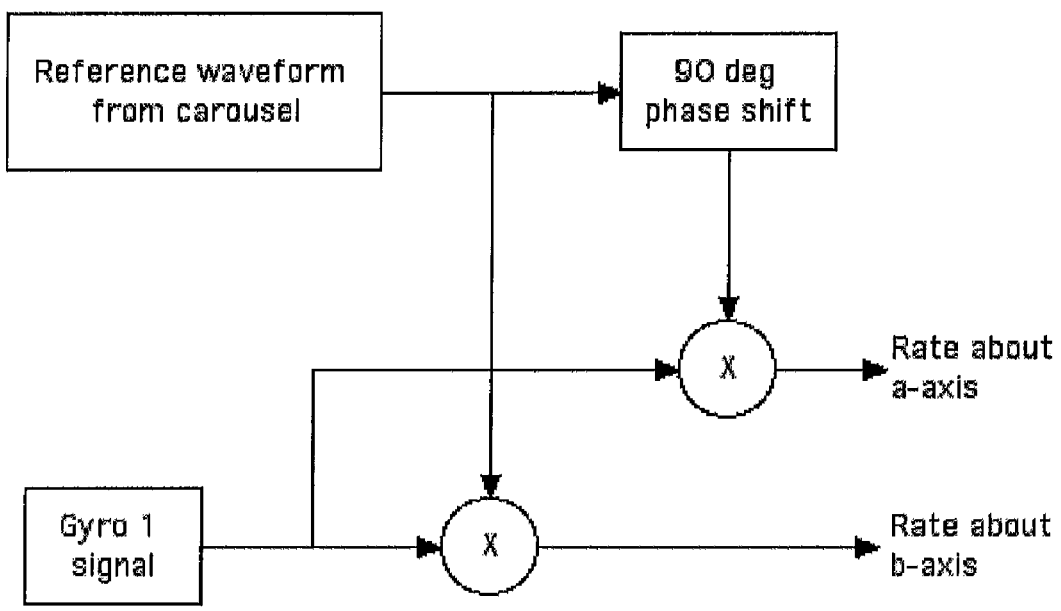
FIG. 6 is a schematic block diagram of a system for demodulating the signals from a gyroscope of FIG. 4 to create an output of FIG. 5.

To separate the two contributions in the G1 signal, apply the circuit/algorithm described in FIG. 6. The sum signal is first separated into two channels. In the a-axis channel, the sum signal is mixed with a waveform referenced to the a-axis that will pass the a-axis input rate signal and filter the b-axis input rate signal. In the b-axis channel, the signal is mixed with a second waveform referenced to the b-axis to pass the b-axis rate signal. The mixing is a demodulation procedure as used in lock-in processing. The reference waveform can be a square wave with its leading edge aligned with the carousel zero and 90 degree phase angle as provided by the resolver, or a sinusoidal reference can be used.

Figure 7:
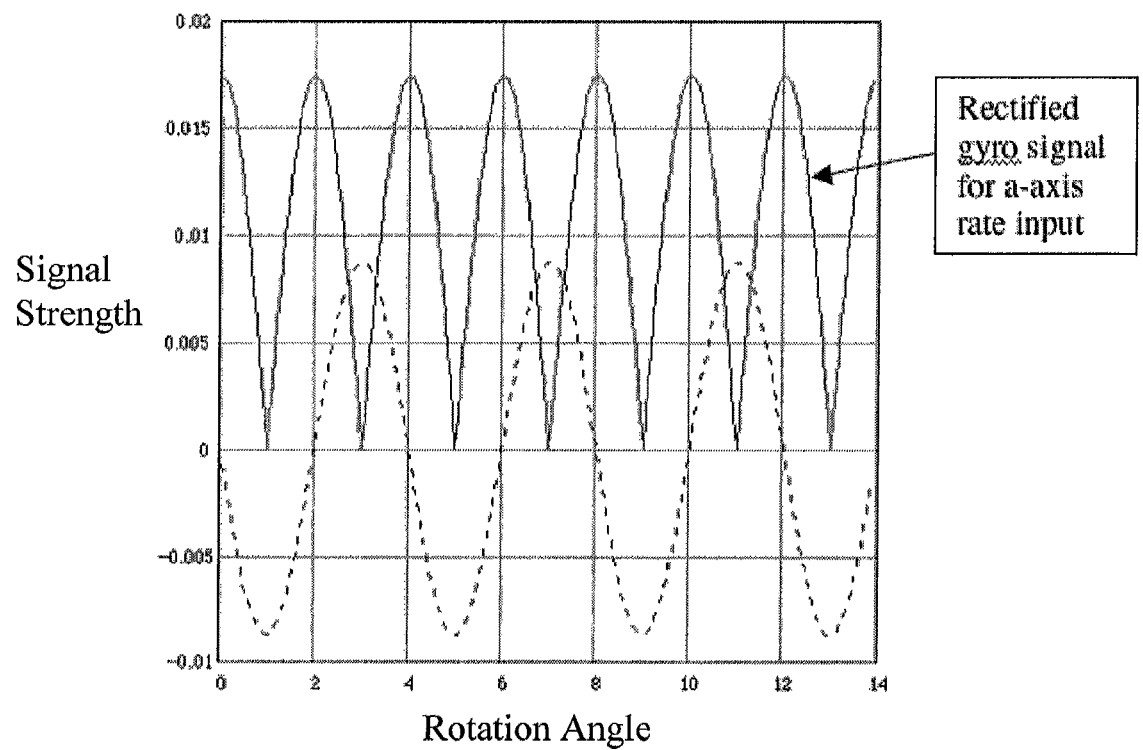
FIG. 7 show the effect of demodulation of one channel in the system of FIG. 6.

FIG. 7 illustrates how the demodulation (mixing) functions in the a-axis channel. The waveform referenced to the a-axis rectifies the a-axis input rate signal, which is processed to generate a DC value proportional to the a-axis input rate. The same waveform when applied to the b-axis component causes a cancellation of the signal (not shown).

Gyro Stabilization with PSD

Figure 8:
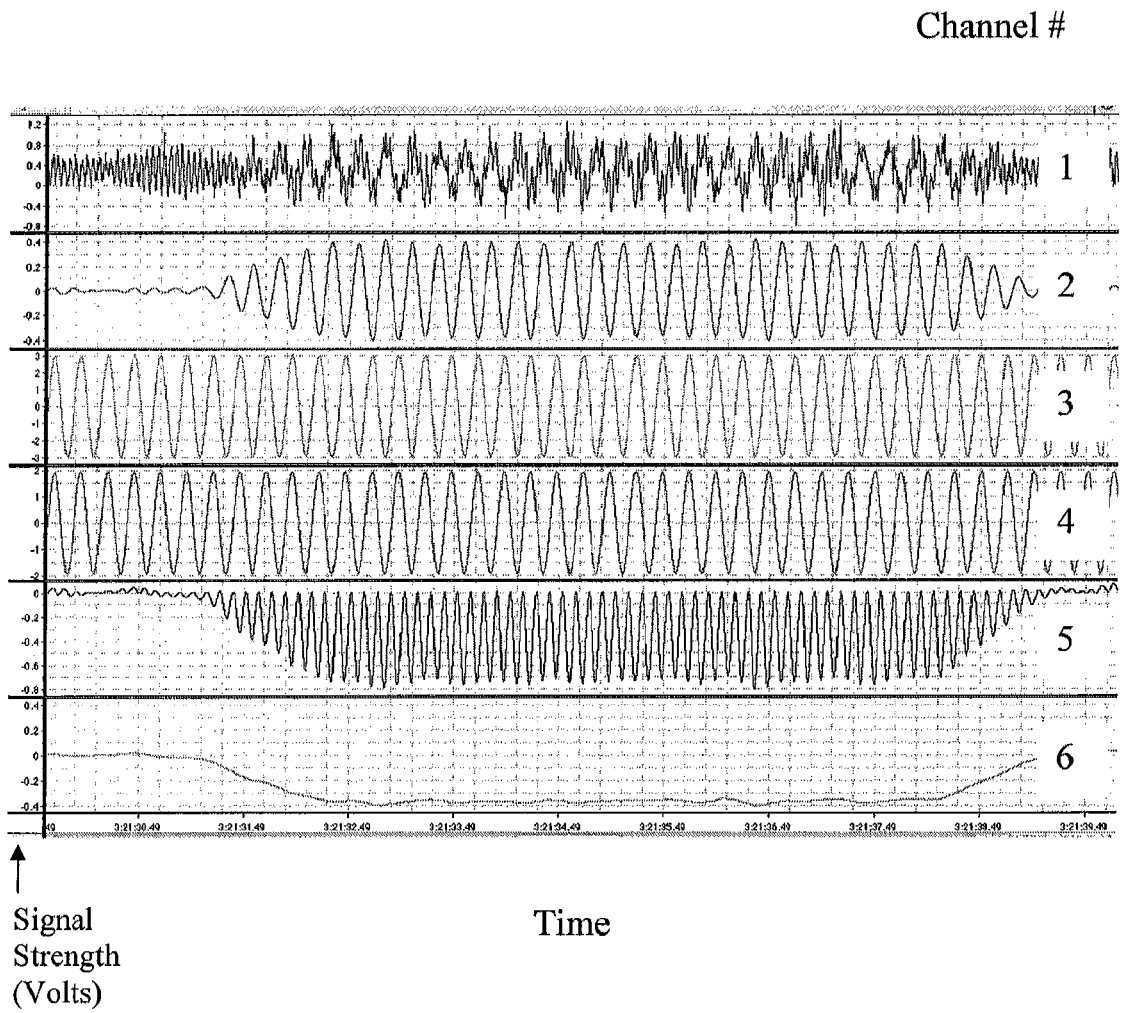
FIG. 8 is an example of typical bias stabilized gyroscope data using phase sensitive demodulation.

Phase Sensitive Demodulation is illustrated with actual data. The data is taken by a Data Acquisition System, which also contains software for processing the data. The data is organized in channels as shown in FIG. 8. The time record is obtained for a gyro spun about the spin axis and with an input rotation applied about an orthogonal Input Axis. The modulation is caused by the rotation of the gyro relative to the Input Axis. The Time Record also includes substantial bias instability (noise).

The plots illustrate the following data:

Channel 1: Time Record of gyro

Channel 2: Band-Pass filter applied to the Channel 1 data (Gyro Time Record)

Channel 3: Resolver signal

Channel 4: Band-Pass filter applied to Channel 3 data (Carousel signal)
Channel 5: Multiplier demodulation of Channel 2 and Channel 4
Channel 6: Low-pass filter of Channel 5 data; stabilized Time Record of Gyro Channel 1 shows the gyro signal modulation caused by the spin plus bias instability. The noise is comparable to the signal for this input rate.

Channel 2 shows the gyro signal modulation after the band-pass filter is applied to remove the bias instability plus bias offset. The reason for the amplitude variation at both ends of the data stream is that it takes time for the rotation rate table to start and stop.

Channel 3 shows the signal from the angle resolver, which is built into the spin fixture. This signal is used later to demodulate the gyro signal.

Channel 4 shows the resolver signal after it is band-pass filtered to make sure it does not contain bias and other noise. The signal is time-shifted to be in-phase with the gyro signal in Channel 2 to obtain a maximum signal.

Channel 5 shows the demodulation result obtained by multiplying channels 2 and 4. This function is intended to obtain a DC value corresponding to the gyro signal peak. However it also is accompanied with a signal at twice the modulation frequency. The signal is optimized when the resolver signal is phase-shifted so that it is in phase with the gyro signal in Channel 2.

Channel 6 shows the scale factor step signal for 100 deg/sec rotation rate after a low pass filter is applied to Channel 5 to eliminate the higher frequency content leaving just the DC value.

Accelerometer Stabilization with PSD

Figure 9:
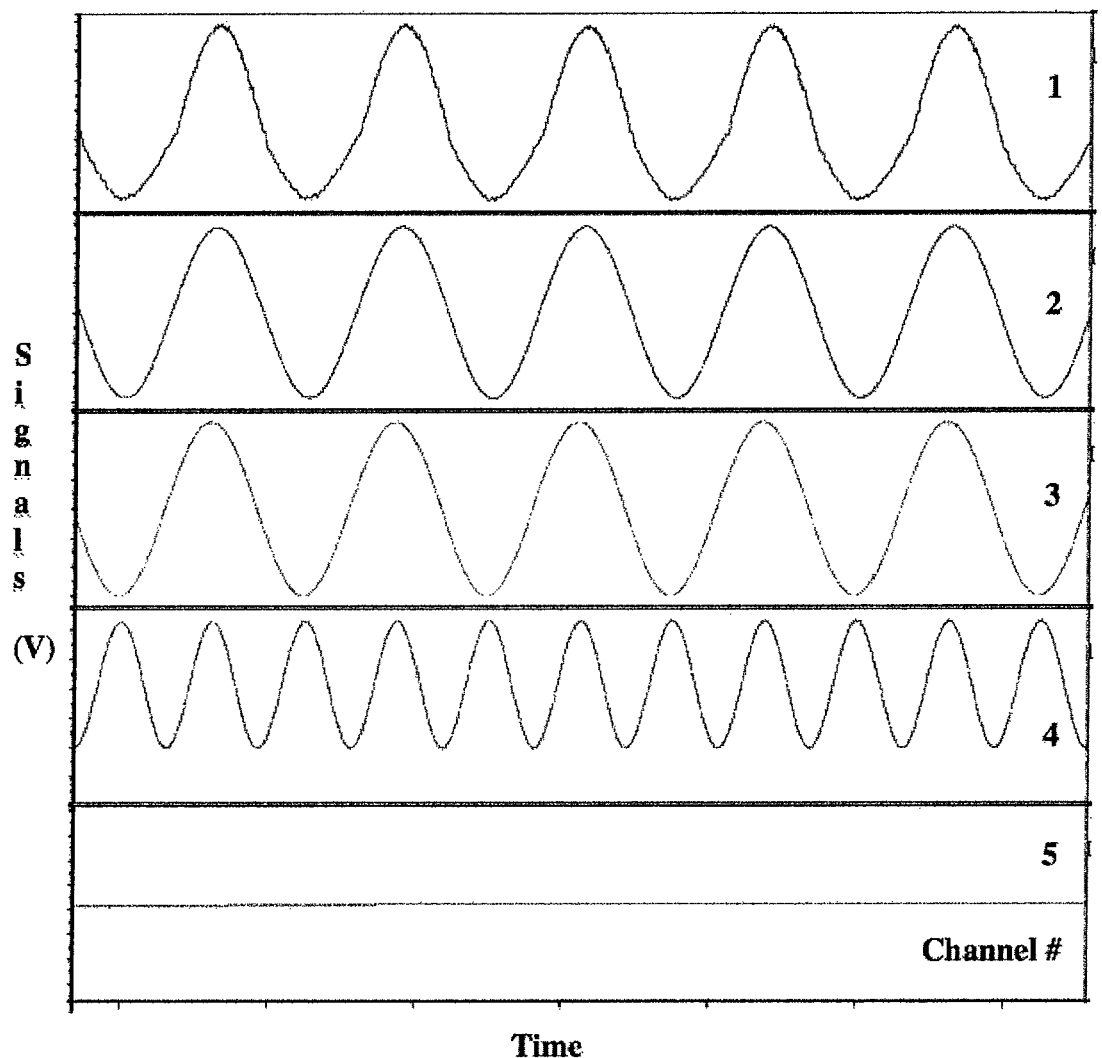
FIG. 9 is similar data, but for a an accelerometer of the IMU of FIG. 1.

A Time Record was also obtained for an accelerometer with G-Input. The data and processing is compiled graphically as a function of time in several channels as shown in FIG. 9.

Channel 1: Time Record of accelerometer
Channel 2: Band-Pass filter applied to the modulated accelerometer signal (Channel 1)
Channel 3: Resolver signal
Channel 4: Multiplier demodulation of Channel 2 and Channel 4
Channel 5: Low-pass filter of Channel 4 data; stabilized Time Record of accelerometer Channel 1 data is the time record for the accelerometer output as the accelerometer is spun. The spin frequency is 4 Hz. The signal is distorted. Note that the data also contains a bias offset. The acceleration input is gravity.

Channel 2 shows the accelerometer data after it is band-pass filtered. The bias is removed as well as the frequency content that caused the signal distortion. This signal has the quality of the resolver signal and would yield a good reference waveform for gyro demodulation in the spinning rocket application (further described below).

Channel 3 shows the angle resolver signal to be used as the reference for demodulating the accelerometer signal of Channel 2. Note that it is time-shifted to be in-phase with the accelerometer signal peak, which means that the demodulated output will be maximized.

Channel 4 shows the result of demodulating the accelerometer signal with the resolver signal. The result is a DC component plus an AC signal at twice the modulation frequency.

Channel 5 shows the DC component after low-pass filtering. The DC value is the measure of G acceleration after noise and general instability are removed.

Summary of PSD Method

Figure 10:
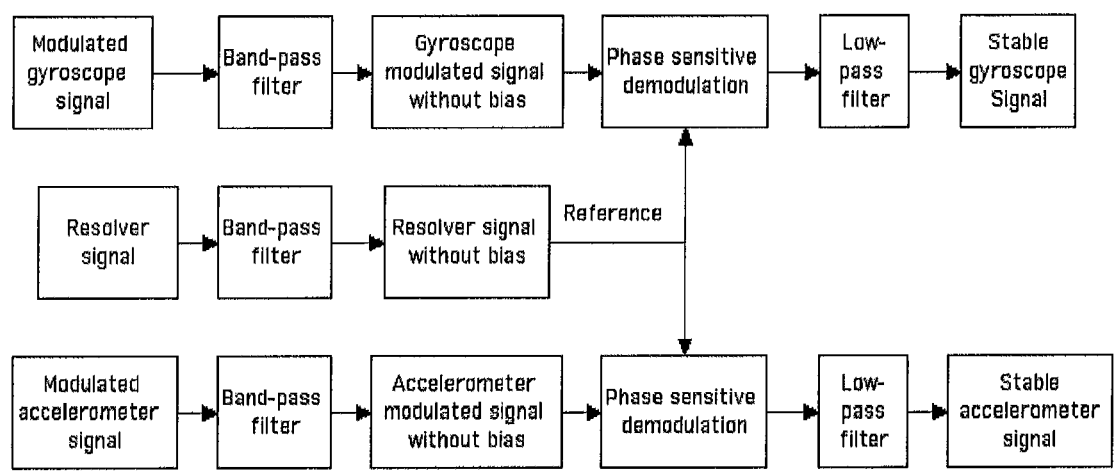
FIG. 10 is a schematic diagram of the phase-sensitive demodulation of the X and Y gyroscopes and accelerometers of a rotated IMU.

The PSD method for X or Y gyros and X or Y accelerometers can be summarized with the block diagram in FIG. 10. The carousel spins the MEMS IMU containing gyroscopes and accelerometers. The spin rotates the Input Axes of the X, Y gyroscopes about the Spin Axis into and out of alignment with the input rotation rates about the Pitch and Yaw Axes thereby modulating the gyroscope signal. The modulated gyroscope signal is band-pass filtered to remove any DC bias components plus higher frequency content. The cleaner gyro modulation signal is demodulated using the reference waveform. The gyroscope signal is then low-pass filtered to obtain the stable gyroscope signal. The same approach follows for the X, Y accelerometers. The X, Y accelerometers signals are modulated by the spin as they come into and out of alignment with the Pitch and Yaw Axes. The modulated accelerometer signals are band-pass filtered to remove bias and higher frequencies. The cleaner modulated signals are then demodulated to DC. A low pass filter eliminates higher frequencies caused by the demodulation process leaving a stable accelerometer signal.

Spin-Stabilization, Spinning Rocket Application

Figure 11:
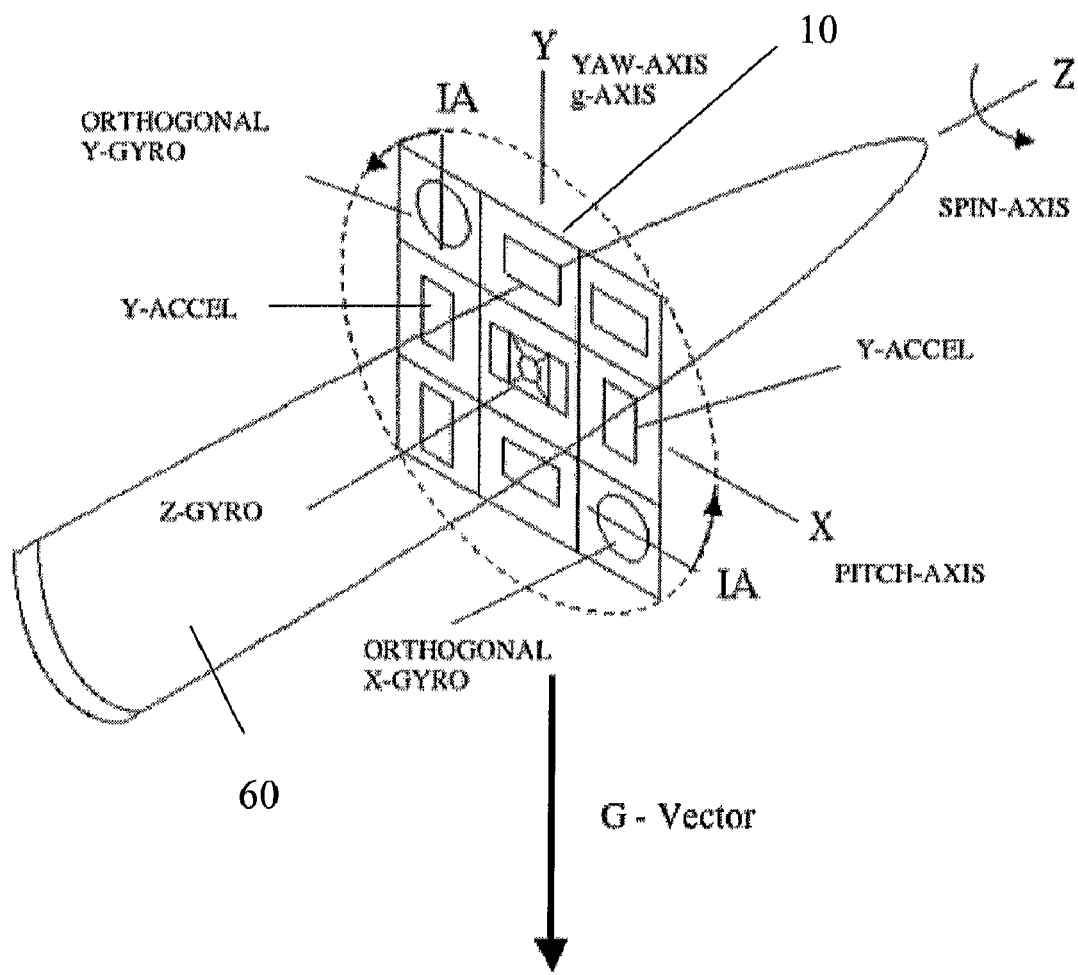
FIG. 11 is a schematic diagram of the orientation of the MEMS IMU in a spinning aerial vehicle according to an embodiment of the invention.

The MEMS IMU 10 of FIG. 1 is installed in the rocket with the normal to the plane aligned with the spin axis of the rocket as shown in FIG. 11. In the planar IMU this corresponds to the Z-Gyro being aligned with the spin axis. The alignment is made sufficiently well that the X, Y gyroscopes do not sense a component of the rocket spin. The X, Y gyroscopes are selected for very low cross-axis sensitivity so that the output is not affected by the spin, independent of the alignment issue. The X, Y accelerometer instruments are aligned orthogonally to the spin radius and therefore do not sense centrifugal forces caused by the spin acting on the proof mass.

The rocket acts as the carousel for spinning the X, Y gyroscopes and accelerometers. As the X, Y instruments are spun, the rotation rates and accelerations will be sensed for inputs in the plane of the IMU and the signals will be modulated as the instrument Input Axes are rotated in relation to the Pitch and Yaw Axes (non-rotating body axes). The demodulation references will be obtained from the X, Y accelerometers that sense the G-Axis component in the plane of the IMU. These references will be used for both the gyroscopes and the accelerometers themselves. The G-Axis will also serve as the reference for obtaining the non-spinning Body Axes.

Figure 12:
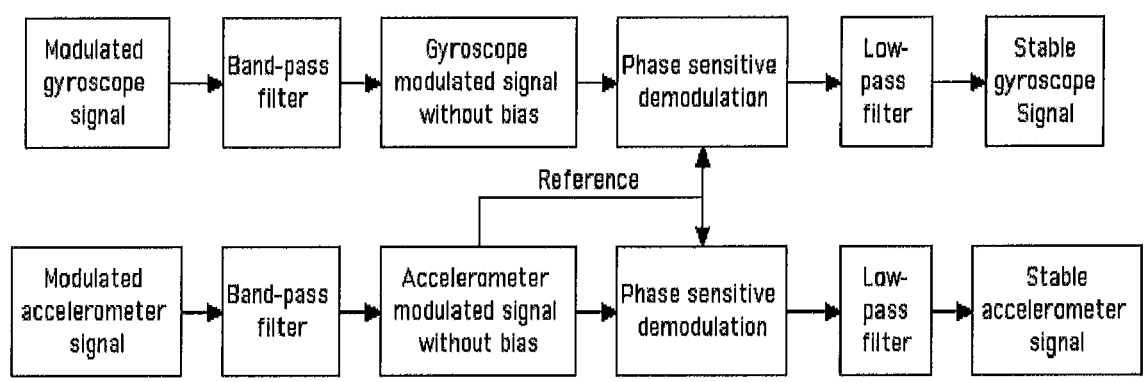
FIG. 12 is a bias stabilization block diagram for an embodiment of the invention.

The PSD method for the spinning rocket is shown with the block diagram in FIG. 12. The rocket spins the MEMS IMU containing gyroscopes and accelerometers. The spin rotates the Input Axes of the X, Y gyroscopes and accelerometers about the Spin Axis into and out of alignment with the non-spinning Pitch and Yaw Axes (related to Earth's Axes), thereby modulating the gyroscope and accelerometer signals. The modulated gyroscope signal for each gyro is band-pass filtered to remove any DC bias components plus higher frequency content. The modulated signal for each accelerometer is band-pass filtered to remove bias and higher frequency content. The cleaner gyroscope modulated signal is demodulated using the reference waveform obtained from the cleaner X, Y accelerometer signals. The gyroscope signal is then low-pass filtered to obtain the stable gyroscope signal. The cleaner accelerometer signal is also demodulated using the same reference waveform and the result low-pass filtered to obtain the stable accelerometer signal.

Pitch and Yaw PSD Algorithms

In the lab, the Pitch and Yaw Axes are easily identifiable by the spin modulation of the X, Y accelerometers signals as the accelerometers peak when they align with the G-Vector, because there is no other acceleration input. The description follows for spinning but stationary vehicle. For instance, when the two Y-accelerometers peak (align with the G-Axis), the X-Gyro is aligned with the Pitch Axis. The Y-gyro then is aligned with the Yaw Axis. If both pitch and yaw rates are applied, then a reference waveform developed from the Y-accelerometers will be used to demodulate the yaw rate component from the Y-gyro signal and the pitch rate component from the X-gyro signal. By phase shifting the Y-accelerometer reference waveform by 90 degrees, the yaw rate component will be demodulated from the X-gyro as it comes into alignment with the Yaw Axis and the pitch rate component will be demodulated as the Y-gyro comes into alignment with the Pitch Axis. The significance of this description is that the two gyros are redundant. This description is demonstrated with the block diagram of FIG. 13.

Note that the X-accelerometers can also be used as they align with gravity to obtain a demodulation reference waveform. In this case the Y-gyroscopes align with the Pitch Axis to obtain the Pitch rate.

For the stabilization of the X, Y accelerometers, the same reference waveform used to stabilize the gyroscopes (that was obtained from the Y-accelerometer signals) is used to stabilize the accelerometer signals. The description is given with FIG. 14. Note that the Pitch Axis reference waveform will obtain the acceleration component along the Pitch Axis from the sum signal of the X-accelerometer and obtain the acceleration component along the Yaw Axis from the sum signal of the Y-accelerometer. By using the Yaw reference waveform, which is obtained by a 90 degree phase shift of the Pitch Axis reference waveform, the acceleration component along the Yaw Axis is obtained from the X accelerometer and the acceleration component along the Pitch Axis is obtained from the Y-accelerometer.

The significance of this schematic is that the acceleration components along both axes can be obtained from the same accelerometer by using two reference waveforms. The two accelerometers then are redundant. To make a smaller IMU one accelerometer (or the two accelerometers for one axis in the IMU lay-out described above) can be dropped.

Reduced IMU

Figure 13:
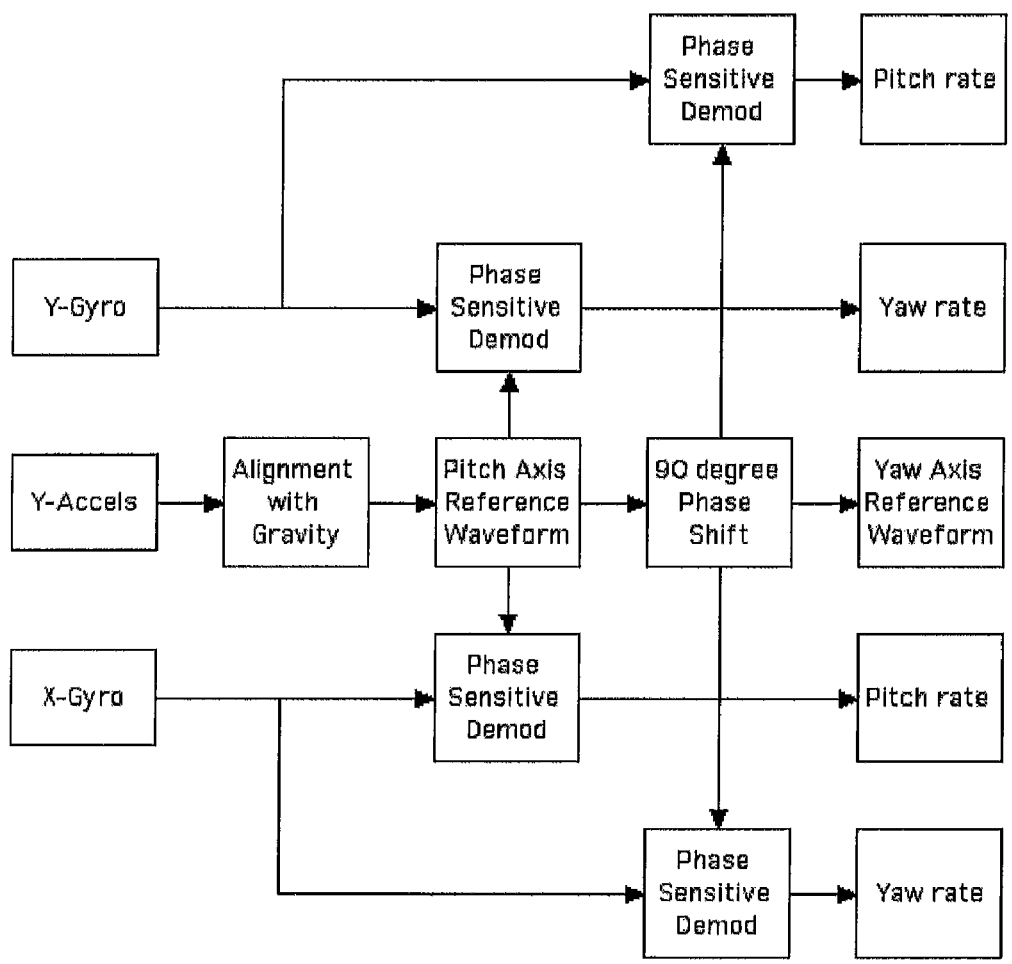
FIG. 13 is a block diagram of the use of two gyroscopes, using an accelerometer reference waveform, for an embodiment of the invention.
Figure 14:
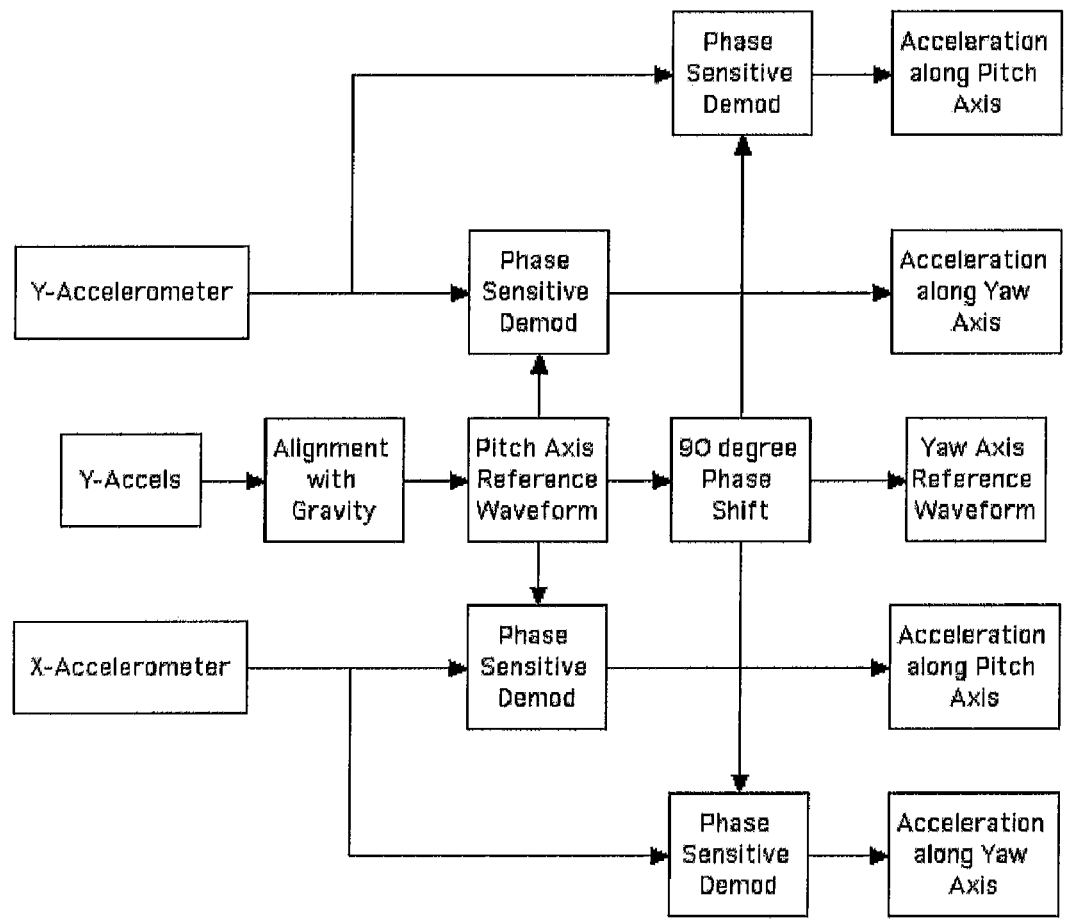
FIG. 14 is a block diagram of the use of two accelerometers, using an accelerometer reference waveform, for an embodiment of the invention.

As described by the schematics of FIGS. 13 and 14, a necessary and sufficient IMU for the spinning rocket is one using: one Z-accelerometer, one Z-gyroscope, one X (or Y) accelerometer and one X (or Y) gyroscope. To restate, because of the spin, each in-plane gyroscope and accelerometer senses inputs from both body axes. By demodulating each with waveforms referenced to both body axes, both components can be separated. Therefore only one in-plane gyroscope and one in-plane accelerometer is needed. This further reduces the size of the IMU; reduces cost because more IMUs can be fabricated per wafer and eliminates some electronics.

Figure 15:
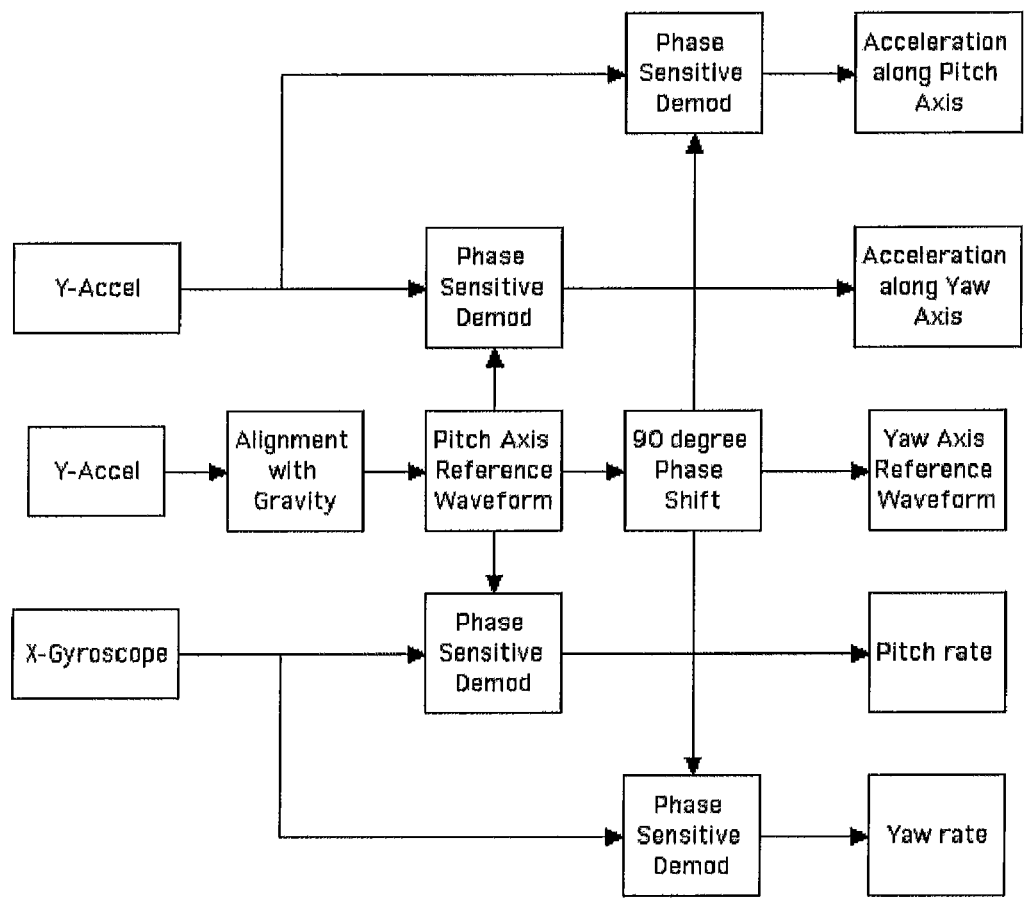
FIG. 15 is a block diagram of the use of one gyroscope and one accelerometer, using an accelerometer reference waveform, for an embodiment of the invention.

For this case the reduced schematic is given in FIG. 15 that includes the stabilization of one in-plane gyroscope and one in-plane accelerometer. The Z-gyroscope and Z-accelerometer are not stabilizable and are not included in the schematic.

For this four instrument IMU the Input Axes of the gyroscope and accelerometer are orthogonal. Therefore if the X-gyroscope is used then the accelerometer needs to be a Y-accelerometer.

General Case of Accelerometer Reference Algorithm

Figure 16:
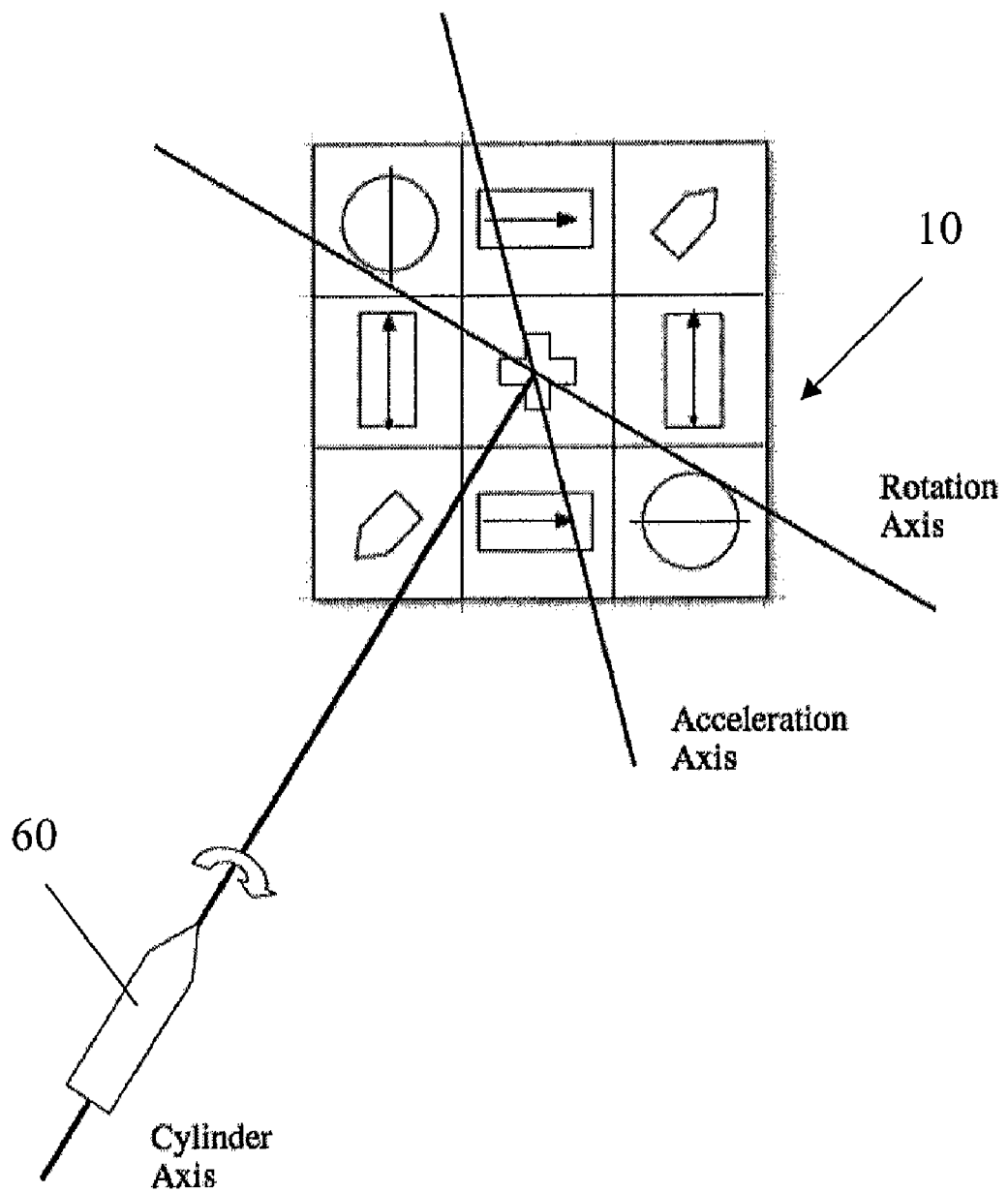
FIG. 16 is a schematic diagram showing the IMU of FIG. 1 in use in a spin-stabilized rocket according to the invention.

For the general case, other accelerations are added to G as the spin rocket is airborne and the orientation of the vehicle varies relative to the Gravity Axis. The general IMU/rocket orientation is described with FIG. 16 (using IMU 10 shown in FIG. 1).

The Planar IMU contains all the gyroscopes and accelerometers on one planar substrate with one instrument per cell; the description is schematic; the input axes are designated by lines.

The plane of the Planar IMU is orthogonal to the cylinder axis of the rocket (also known as the Spin Axis).

As the rocket spins, so does the Planar IMU and all its instruments.

The Z-gyro (Gz) 20 is aligned with the Cylinder Axis and measures the spin rate (spin rate is assumed constant).

The X, Y gyros (Gx 28, Gy 12) input axes rotate in the plane about the Cylinder Axis Gyros Gx, Gy measure rotation of the rocket (other than spin) about a Rotation Axis in the plane.

The Z-accelerometers (Az 16 and 24) are aligned with the Cylinder Axis and measure forward acceleration.

The X, Y accelerometers (Ax 14, 26, Ay 18, 22) input axes rotate in the plane about the Cylinder Axis.

Lateral acceleration of the rocket occurs in the plane.

Flight Orientation

Figure 17:
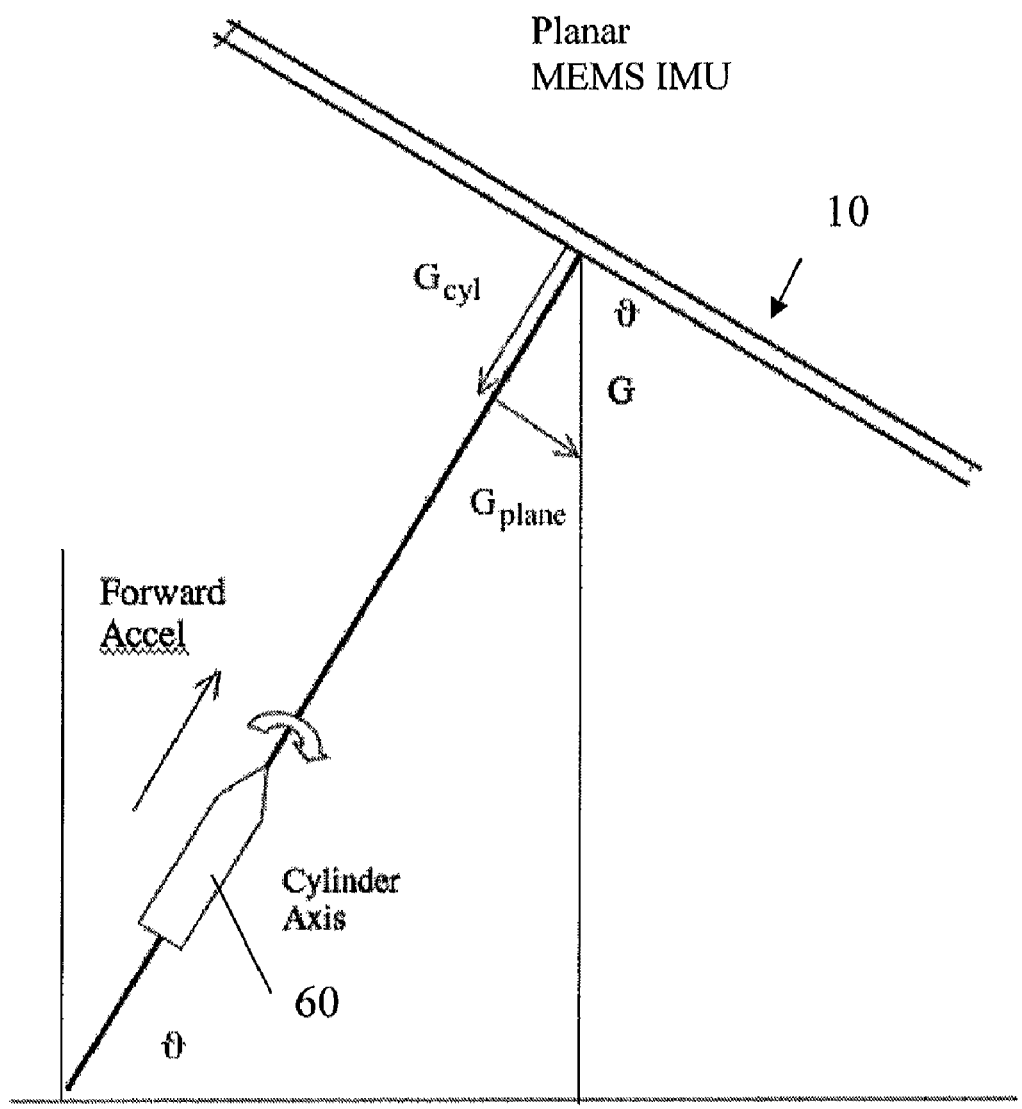
FIG. 17 is a schematic diagram illustrating the gravity force vectors for the example illustrated in FIG. 16.

The rocket is described in flight with some orientation, and with the IMU orthogonal to the spin axis. The rocket is underway with acceleration and spin and with an instantaneous orientation to ground as shown in FIG. 17. For this orientation, the G vector is added and its vector components in the plane and along the Cylinder Axis are shown: $G_{plane}$, and $G_{cyl}$, respectively. Note that the Ax, Ay accelerometers are sensitive to the component $G_{plane}$. And with changing elevation angle, $\Theta$, the magnitude of $G_{plane}$ changes, achieving the maximum G for $\Theta=0$ deg and zero for $\Theta=90$ deg. The accelerometers will peak when they align with $G_{plane}$. For this case, the Pitch Axis is out of the page. $\Theta$ is the rotation angle about the Pitch Axis. The forward acceleration is along the Cylinder Axis.

Accelerometers Under Spin with 1 G Input

Figure 18:
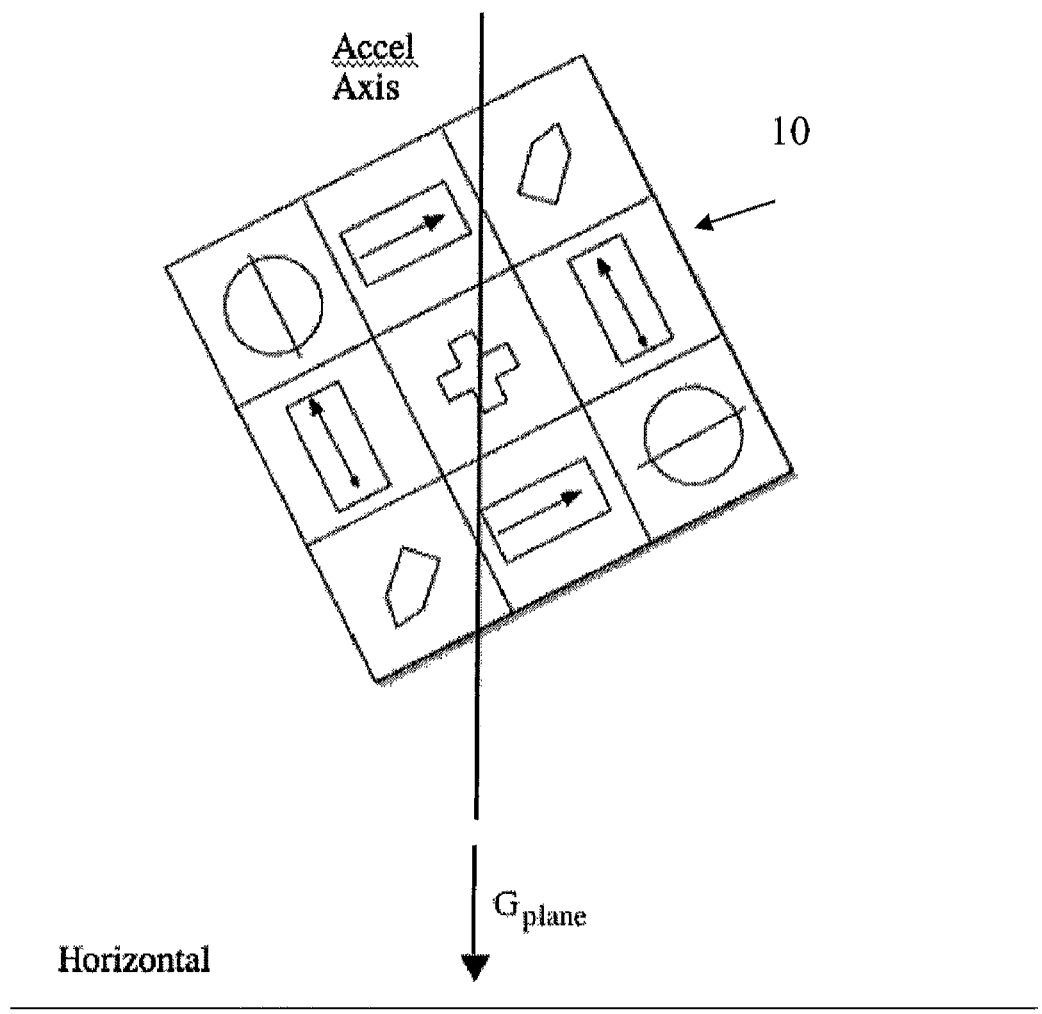
FIG. 18 is an in-plane view of the IMU as illustrated in FIGS. 16 and 17, which helps to explain the effect of spin on the X and Y accelerometers.

To evaluate how the accelerometers behave under spin and with the $G_{plane}$ component of gravity for this elevation angle $\Theta$, we look at the projection of the IMU plane along the Cylinder Axis. Therefore, the Planar IMU is laid flat on the page in FIG. 18 and is shown with a given spin rotation angle for generality. We add the Acceleration Axis because it is known and is aligned with the $G_{plane}$ axis. The rocket direction is into the page.

As the IMU spins, accelerometers Ax and Ay come into and out of alignment with the Acceleration Axis. When they are aligned, the signals peak. When they are orthogonal, the signal amplitudes are zero. When observed continuously, the signals vary sinusoidally. The amplitude is proportional to the acceleration amplitude from $G_{plane}$. Since Ax and Ay are of the same design, the signal outputs are equal. Because the two Ax accelerometers and the two Ay accelerometers are displaced rotationally by 90 degrees on the IMU, the signal peaks for the two sets are separated in time by 90 degrees of spin phase.

Note 1: As the IMU spins, the accelerometers peak every $\pi/2$ of rotation angle.

Note 2: When each accelerometer set peaks, the two accelerometers of the set are horizontal and orthogonal to the $G_{plane}$ vector. By knowing the accelerometer scale factor with G input, the elevation angle, $\Theta$, can be calculated.

Note 3: When each set of X, Y accelerometers peak, the Pitch Axis is defined as orthogonal to $G_{plane}$ and is aligned with the Horizon.

Note 4: The Yaw Axis is out of-the-page.

Accelerometers Under Spin with Added Lateral Acceleration

Figure 19:
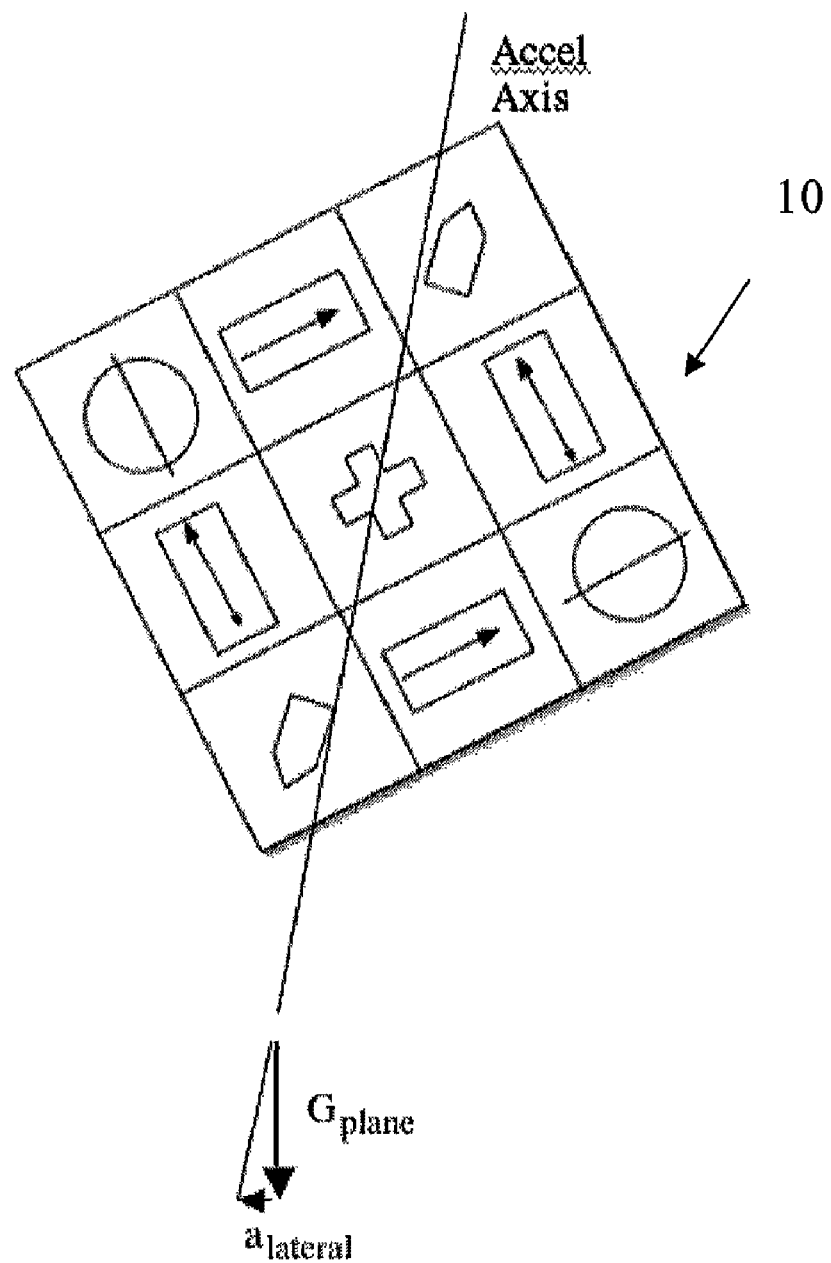
FIG. 19 is a view very similar to that of FIG. 18, but adding a lateral acceleration component.

To evaluate how the accelerometers behave under spin and with the more general acceleration (input equal to the sum of $G_{plane}$ acceleration plus a lateral acceleration), we again observe the projection of the IMU plane along the cylinder axis. FIG. 19 adds the lateral component. In this more general case, the Acceleration Axis is defined by the vector sum of the two components and is shown to be rotated relative to the $G_{plane}$ case.

As the IMU spins, accelerometers Ax and Ay again come into and out of alignment with the Acceleration Axis, albeit at a different spin rotation angle.

Note 1: As the IMU spins, the accelerometers peak every $\pi/2$ of rotation angle but at a later time for clockwise rotation.

Note 2: When each accelerometer set peaks, the two accelerometers are not horizontal.

In this case the peak response of the accelerometers is used to find the Acceleration Axis. The acceleration magnitude is related to the peak of the modulation amplitude.

Two possible sources of lateral acceleration are wind changes and motion of the vehicle in a trajectory in the plane with a turn radius that causes centripetal acceleration in the plane. By sensing the wind, the wind contribution to the Acceleration Axis can be compensated. By making use of the rotation rate data from the gyros, the centripetal acceleration can be calculated and used to determine the $G_{plane}$ axis. These corrections would re-enable the identification of the horizon.

The importance of the horizon is that it provides a reference axis for the gyroscopes. With an unknown lateral acceleration component, the horizon is not knowable.

Correlation of the Z-Gyro with Accelerometers, Ax, Ay

Figure 20:
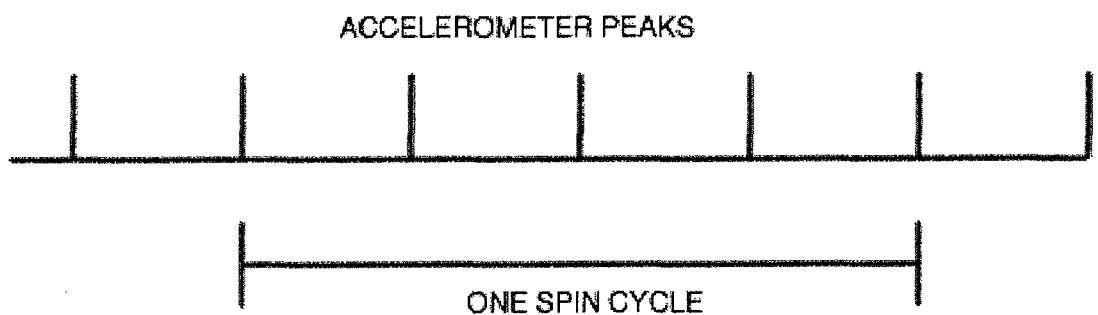
FIG. 20 is a time-line illustrating the correlation of Z-gyro rotation with the in-plane (X and Y) accelerometers.

The timing relationship between the Z-Gyro and the X, Y accelerometers is useful for establishing the accelerometer reference. On a time scale as shown in FIG. 20, where the spin speed is constant, the accelerometers peak every $\pi/2$ of spin rotation angle as they align with the Acceleration Axis. Also with every four peaks, a full spin rotation is obtained. Several observations are made:

the elapsed time for the four peaks can be used to calculate the spin rate and compare it to the Z-gyro rotation rate measurement,
 knowing the spin rate accurately (using the accelerometer peaks) may allow the calculation of the angle random walk error for the Z-gyro by comparing the $2\pi$ rotation angle with the integrated value using the rotation rate sensed by the Z-gyro after one rotation (to improve the measurement, multiple spin revolutions can be used), and
 the rotation of the Acceleration Axis due to lateral acceleration can be monitored by noting the time shift of the accelerometer peaks relative to the spin rate.

Rocket Rotation about an Axis in the Plane, Rotation Axis

Figure 21:
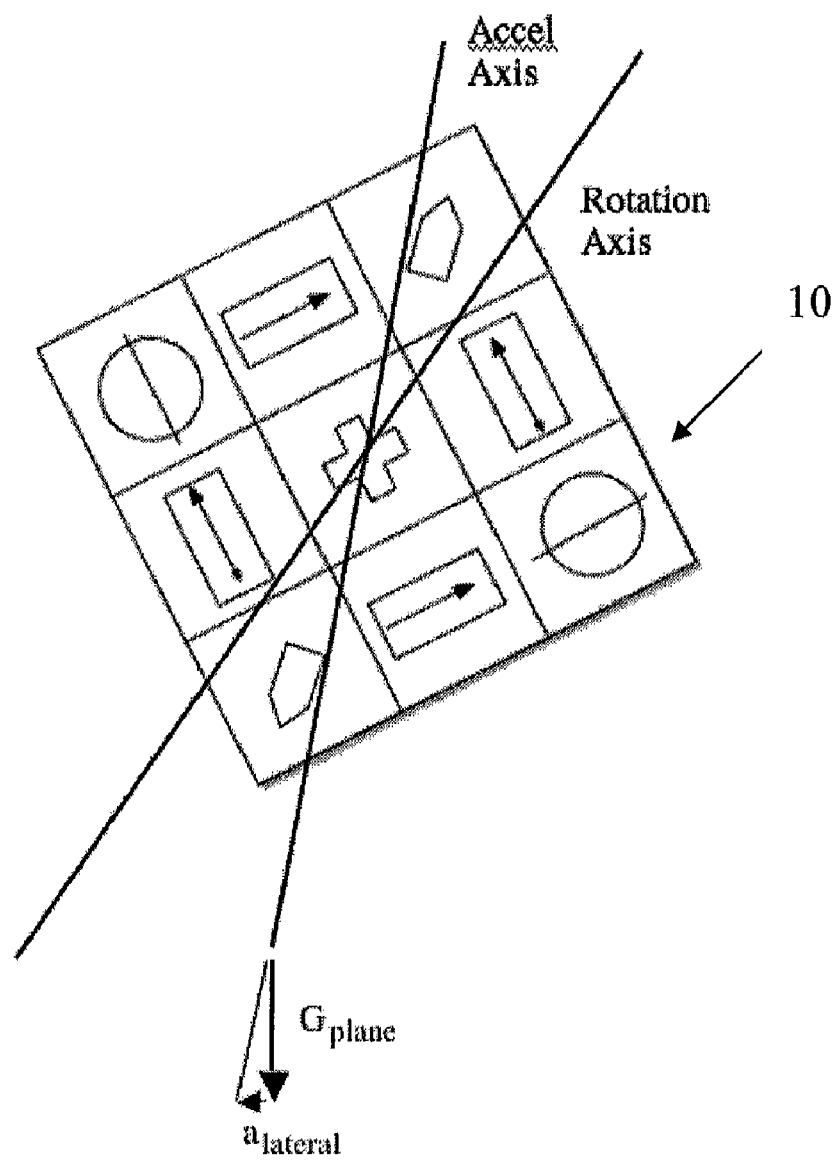
FIG. 21 is a view very similar to that of FIG. 19, but adding an in-plane rotation axis.

In this topic the gyro signal is described with spin. Only rotations that occur about axes in the plane need to be considered. A particular rotation occurs with the rate of change of the elevation angle, $\Theta$. The second rotation rate is for the azimuth angle (not shown), but orthogonal to the elevation rate. FIG. 21 is a description of a general Rotation Axis in the plane. As the IMU spins, the two gyroscopes come into and out of alignment with the Rotation Axis, with the signals maximizing when they are in alignment. The signal amplitude is proportional to the rotation rate about the Rotation Axis.

Note 1: the gyroscopes determine the Rotation Axis in the plane

Figure 22:
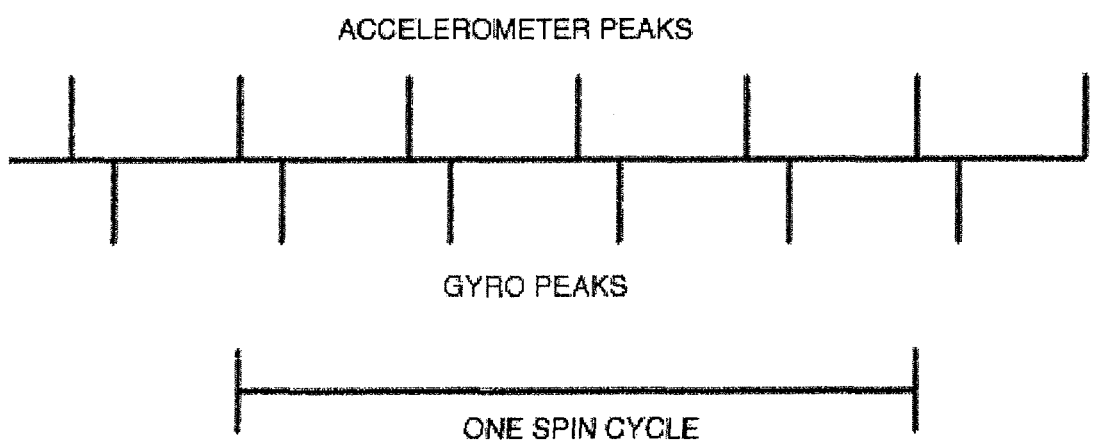
FIG. 22 is a time-line illustrating the correlation of Z-gyro rotation with the in-plane (X and Y) accelerometers and gyroscopes.

Note 2: the amplitude of the modulated signal is proportional to the rotation rate about the Rotation Axis The gyro peaks occur at the same rate as the accelerometer peaks (four per rotation) but not necessarily at the same time, since the Rotation Axis and Acceleration Axis are not coincident. FIG. 22 shows the superimposed gyro peaks on the accelerometer peaks timeline. The gyro peaks occur later because based on a clockwise spin.

This description is useful for a spinning rocket provided the vehicle is not in free-fall: when the vehicle, accelerometer case and accelerometer proof mass all fall together. In free-fall, the mass does not deflect and the accelerometer peaks do not occur. Only lateral acceleration will be sensed.

Figure 23:
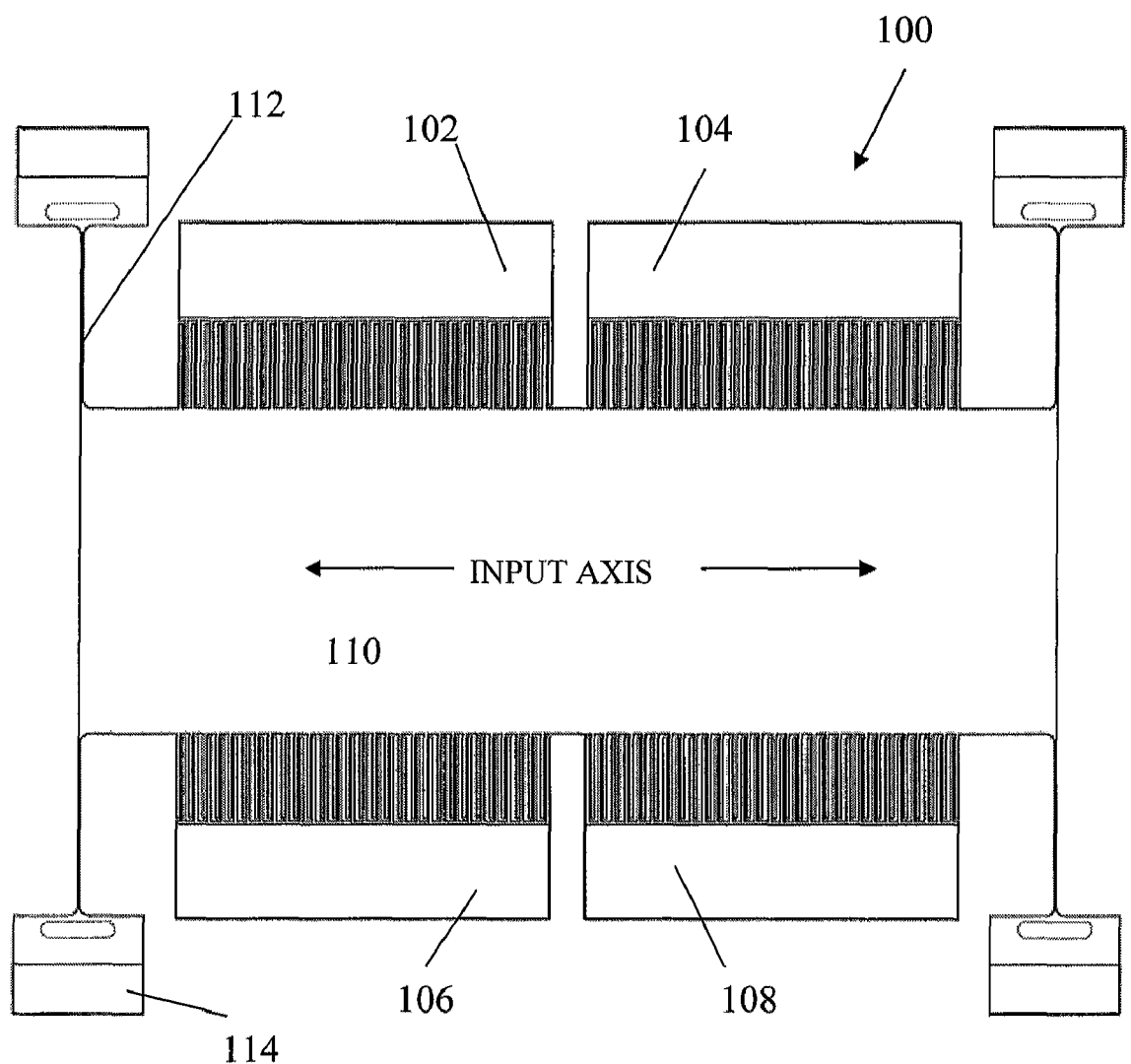
FIG. 23 is a schematic view of an X or Y accelerometer that can be used with the IMU for the invention.
Figure 24:
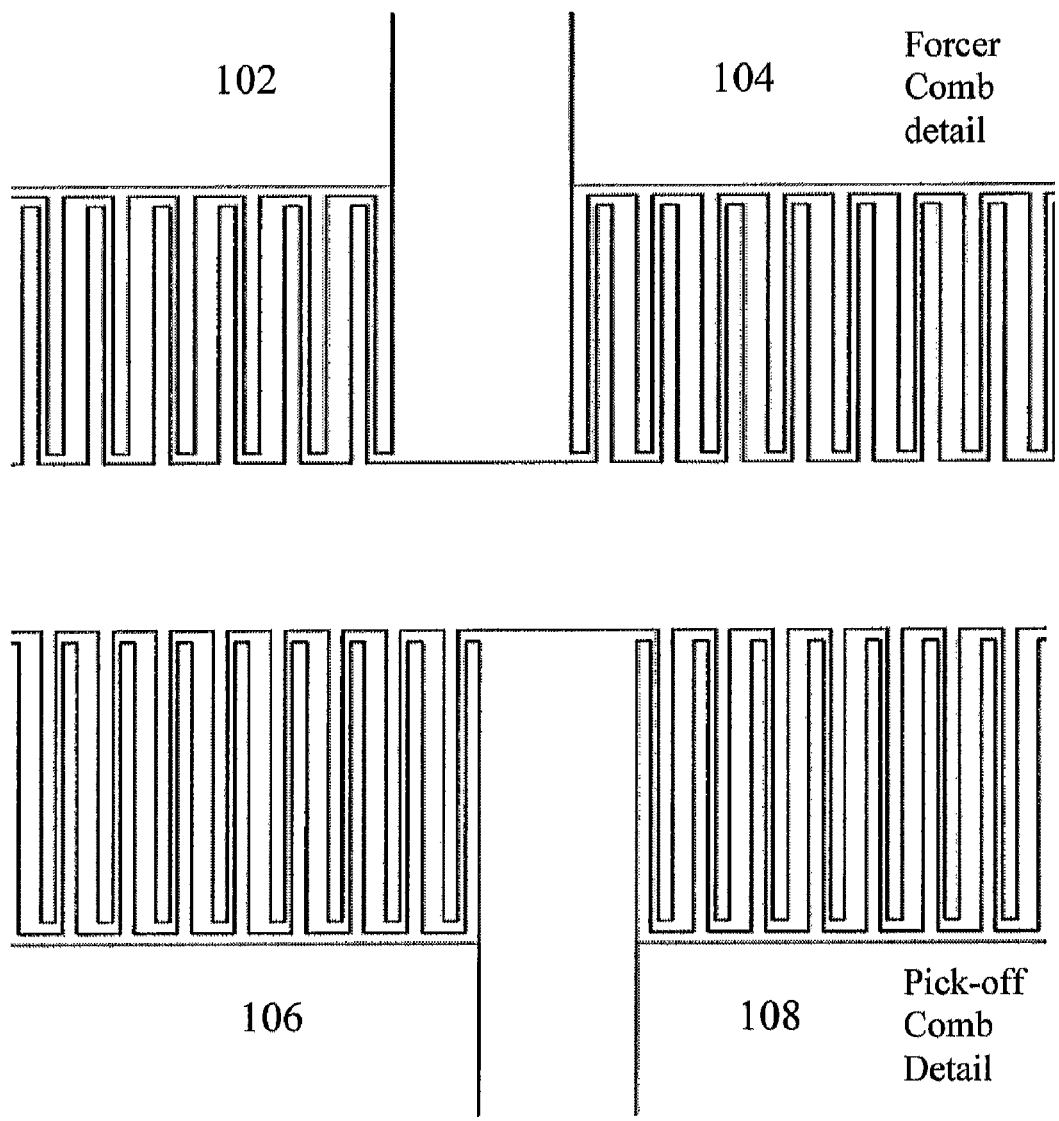
FIG. 24 is a close-up view of portions of the pick-off and forcer combs of the accelerometer of FIG. 23.

Detail of an embodiment of an X or Y accelerometer 100 that can be used in the invention is shown in FIGS. 23 and 24. It comprises the proof mass 110 that moves laterally along the Input Axis subject to acceleration input along the same axis. The displacement of the proof mass is a measure of the acceleration and it is measured by two linear combs pick-offs 102, 104 that work differentially. If operated in closed-loop mode, a "forcer" is used to hold the proof at the zero position. In this case the voltage applied to the forcer is proportional to the input acceleration. The forcer comprises two combs 106, 108 that work in a push-pull fashion. Four flexures 112 attach the proof mass to four posts 114 that are fixed to the substrate. The stiffness of the flexures determines the deflection per unit acceleration.

Greater detail of the pick-off 102, 104 and forcer comb 106, 108 designs is shown in FIG. 24. They are identical. For the pick-off, a capacitance change is measured with proof mass displacement, which is then converted to voltage. For the forcer, a voltage is applied to the comb to apply a capacitance, which translates the proof mass. The comb is made up of comb finger pairs with a small gap between the fingers. A larger gap exists between comb pairs. The number of comb pairs increases pick-off sensitivity and forcer capability. Note that of the two combs for the pick-off, as the proof mass is displaced the small gap for one comb increases and the small gap for the second comb decreases. When these signals are subtracted (differential), the signals are added and common mode noise is rejected. For the forcer, the greater voltage is applied to one of the combs to move in one direction and a greater voltage to the other to move in the opposite direction.

What is claimed is:

1. A system for determining acceleration and rotation of a spinning aerial vehicle that spins about a spin axis, wherein the vehicle rotates about a pitch axis that is orthogonal to the spin axis and is orthogonal to the Earth's gravity axis, and the vehicle also rotates about a yaw axis that is orthogonal to both the spin axis and the pitch axis, the system comprising:
 (a) an inertial measurement unit (IMU) fixed to the vehicle and comprising:
  (i) a first gyroscope having a first gyroscope input axis that is essentially orthogonal to the vehicle spin axis, the first gyroscope also having a first gyroscope output signal; and
  (ii) a first accelerometer having a first accelerometer input axis that is essentially orthogonal to the vehicle spin axis and that is also essentially orthogonal to or essentially parallel to the first gyroscope input axis, wherein the first accelerometer generates a first accelerometer output signal that represents acceleration of the vehicle along the first accelerometer input axis;
 (b) wherein the first gyroscope output signal and the first accelerometer output signal are each modulated by the vehicle spin and thus each possesses an AC component at the vehicle spin rate while the vehicle is spinning; and
 (c) a phase-sensitive demodulation system that extracts the AC components of the first gyroscope output signal and the first accelerometer output signal, derives a reference signal from the AC component extracted from the first accelerometer output signal, and demodulates the AC component extracted from the first gyroscope output signal using the reference signal, to obtain a DC signal representing the rate of rotation of the vehicle about either the yaw axis or the pitch axis.

2. The system of claim 1 wherein the IMU further comprises:
- (iii) a substrate defining a plane, the substrate fixed to the vehicle with the normal to the plane essentially parallel to the spin axis so that the substrate spins about the spin axis as the vehicle spins about the spin axis;
- (iv) wherein the first gyroscope is a generally planar gyroscope coupled to the substrate, wherein the first gyroscope input axis is essentially parallel to the plane; and
- (v) wherein the first accelerometer is a generally planar accelerometer coupled to the substrate, wherein the first accelerometer input axis is essentially parallel to the plane.

3. The system of claim 1 wherein the phase-sensitive demodulation system also phase shifts the reference signal by essentially ninety degrees, to create a phase-shifted reference signal.

4. The system of claim 3 wherein the phase-sensitive demodulation system also demodulates the AC component extracted from the first gyroscope output signal using the phase-shifted reference signal, to obtain a DC signal representing the rate of rotation of the vehicle about the other of the yaw axis and the pitch axis.

5. The system of claim 3 wherein the phase-sensitive demodulation system also demodulates the AC component extracted from the first accelerometer output signal using the reference signal, to obtain a DC signal representing the acceleration of the vehicle along either the yaw axis or the pitch axis.

6. The system of claim 5 wherein the phase-sensitive demodulation system also demodulates the AC component extracted from the first accelerometer output signal using the phase-shifted reference signal, to obtain a DC signal representing the acceleration of the vehicle along the other of the yaw axis and the pitch axis.

7. The system of claim 3 wherein the IMU further comprises:
- (iii) a Z gyroscope having a Z gyroscope input axis that is essentially parallel to the spin axis, and having a Z gyroscope output signal that is related to rotation rate about the spin axis; and
- (iv) a Z accelerometer having a Z accelerometer input axis that is essentially parallel to the spin axis, and having a Z accelerometer output signal that is related to acceleration along the spin axis.

8. The system of claim 1 wherein the IMU further comprises:
- (iii) a second gyroscope having a second gyroscope input axis that is essentially orthogonal to both the vehicle spin axis and the first gyroscope input axis, and having a second gyroscope output signal that is related to the rotation rate about the second gyroscope input axis; and
- (iv) a second accelerometer having a second accelerometer input axis that is essentially orthogonal to both the vehicle spin axis and the first accelerometer input axis, and having a second accelerometer output signal that is related to the acceleration along the second accelerometer input axis.

9. The system of claim 2 wherein the first accelerometer senses the component of the Earth's gravity parallel to the plane of the substrate that is also parallel to the first accelerometer input axis.

10. The system of claim 2 wherein the first accelerometer output signal is at a maximum when the first accelerometer input axis is aligned with the component of the Earth's gravity that is parallel to the plane of the substrate.

11. A system for determining acceleration and rotation of a spinning aerial vehicle that spins about a spin axis, wherein the vehicle rotates about a pitch axis that is orthogonal to the spin axis and is orthogonal to the Earth's gravity axis, and the vehicle also rotates about a yaw axis that is orthogonal to both the spin axis and the pitch axis, the system comprising:
- (a) an inertial measurement unit (IMU) fixed to the vehicle and comprising:
  - (i) a substrate defining a plane, the substrate fixed to the vehicle with the normal to the plane essentially parallel to the spin axis so that the substrate spins about the spin axis as the vehicle spins about the spin axis;
  - (ii) a generally planar gyroscope coupled to the substrate, the gyroscope having a gyroscope input axis that is essentially parallel to the plane and essentially orthogonal to the vehicle spin axis, the gyroscope also having a gyroscope output signal;
  - (iii) a generally planar accelerometer coupled to the substrate, the accelerometer having an accelerometer input axis that is essentially parallel to the plane, essentially orthogonal to the vehicle spin axis, and essentially orthogonal to or essentially parallel to the gyroscope input axis, wherein the accelerometer generates an accelerometer output signal that represents acceleration of the vehicle along the accelerometer input axis;
- (b) wherein the gyroscope output signal and the accelerometer output signal are each modulated by the vehicle spin and thus each possesses an AC component at the vehicle spin rate while the vehicle is spinning; and
- (c) a phase-sensitive demodulation system that:
  - (i) extracts the AC component of the gyroscope output signal and the accelerometer output signal;
  - (ii) derives a reference signal from the AC component extracted from the accelerometer output signal;
  - (iii) phase shifts the reference signal by essentially ninety degrees, to create a phase-shifted reference signal;
  - (iv) demodulates the AC component extracted from the gyroscope output signal using the reference signal, to obtain a DC signal representing the rate of rotation of the vehicle about either the yaw axis or the pitch axis;
  - (v) demodulates the AC component extracted from the gyroscope output signal using the phase-shifted reference signal, to obtain a DC signal representing the rate of rotation of the vehicle about the other of the yaw axis and the pitch axis;
  - (vi) demodulates the AC component extracted from the accelerometer output signal using the reference signal, to obtain a DC signal representing the acceleration of the vehicle along either the yaw axis or the pitch axis; and
  - (vii) demodulates the AC component extracted from the accelerometer output signal using the phase-shifted reference signal, to obtain a DC signal representing the acceleration of the vehicle along the other of the yaw axis and the pitch axis.

12. The system of claim 3 wherein the reference signal and the phase-shifted reference signal have the same amplitude.

13. The system of claim 1 wherein the first gyroscope and the first accelerometer are each single degree of freedom devices.

14. The system of claim 7 wherein the first gyroscope, the first accelerometer, the Z gyroscope and the Z accelerometer are each single degree of freedom devices.

15. The system of claim 8 wherein the first gyroscope, the first accelerometer, the second gyroscope and the second accelerometer are each single degree of freedom devices.

\* \* \* \* \*